United States Patent
Kanegae et al.

(10) Patent No.: US 11,892,109 B2
(45) Date of Patent: Feb. 6, 2024

(54) QUICK CONNECTOR

(71) Applicant: Sumitomo Riko Company Limited, Aichi (JP)

(72) Inventors: Ryousuke Kanegae, Aichi (JP); Yorihiro Takimoto, Aichi (JP); Yoshitsugu Imanishi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 265 days.

(21) Appl. No.: 17/496,792

(22) Filed: Oct. 8, 2021

(65) Prior Publication Data

US 2022/0026003 A1 Jan. 27, 2022

Related U.S. Application Data

(63) Continuation of application No. PCT/JP2020/021514, filed on Jun. 1, 2020.

(30) Foreign Application Priority Data

Jun. 18, 2019 (JP) .................................. 2019-112545

(51) Int. Cl.
*F16L 37/12* (2006.01)

(52) U.S. Cl.
CPC .............................. *F16L 37/1225* (2013.01)

(58) Field of Classification Search
CPC . F16L 37/1225; F16L 37/144; F16L 37/0885; F16L 37/12
See application file for complete search history.

(56) References Cited

U.S. PATENT DOCUMENTS 5,348,353 A * 9/1994 Deweerdt ............. F16L 37/144
285/305
7,552,948 B2 6/2009 Matsuno et al.
8,408,604 B2 4/2013 Yamada et al.
(Continued)

FOREIGN PATENT DOCUMENTS

EP 0826916 A2 * 3/1998
EP 1116911 A2 * 7/2001 ............ F16L 37/144
(Continued)

OTHER PUBLICATIONS

"International Search Report (Form PCT/ISA/210) of PCT/JP2020/021514," dated Aug. 25, 2020, with English translation thereof, pp. 1-4.

*Primary Examiner* — Zachary T Dragicevich
*Assistant Examiner* — James A Linford
(74) *Attorney, Agent, or Firm* — JCIPRNET

(57) ABSTRACT

When a pipe is inserted into a connector main body of a quick connector, first leg parts of a retainer are deformed and expanded by pressing force in the axial direction on tapered surfaces of the first leg parts caused by an annular protrusion of the pipe, and the annular protrusion of the pipe can pass through the first leg parts in the insertion direction. When the pipe releases from the normal position, the retainer moves in a prescribed direction from a standard position, the first leg parts make contact with a first guide of the connector main body, and the first leg parts are deformed so as to expand, and due to the deformation and expansion of the first leg parts the annular protrusion of the pipe can pass through the first leg parts in the release direction.

15 Claims, 14 Drawing Sheets

(56) References Cited

U.S. PATENT DOCUMENTS 8,596,690 B2    12/2013   Yamada et al.
2017/0248263 A1   8/2017   Terada et al.

FOREIGN PATENT DOCUMENTS

| FR | 2891344 A1 * | 3/2007 | ............ F16L 37/088 |
| FR | 3060097 A1 * | 6/2018 | ............ F16L 37/088 |
| JP | 3702671 | 10/2005 | |
| JP | 4871749 | 2/2012 | |
| JP | 4937426 | 5/2012 | |
| JP | 6149081 | 6/2017 | |
| WO | WO-2007036794 A1 * | 4/2007 | ............ F16L 37/088 |

\* cited by examiner

QUICK CONNECTOR

CROSS-REFERENCE TO RELATED APPLICATION

The present application is a continuation of PCT/JP2020/021514, filed on Jun. 1, 2020, and is related to and claims priority from Japanese patent application no. 2019-112545, filed on Jun. 18, 2019. The entire contents of the aforementioned application are hereby incorporated by reference herein.

TECHNICAL FIELD

The present disclosure relates to a quick connector.

BACKGROUND ART

Japanese Patent No. 4937426 and Japanese Patent No. 4871749 describe a quick connector having a retainer formed integrally with a connector housing. The retainer enables an annular protrusion of a pipe to pass therethrough due to expansion and deformation thereof. Further, in a state in which the pipe is inserted in a normal position and the retainer is not expanded and deformed, the retainer is locked with respect to the annular protrusion of the pipe to prevent the pipe from being removed.

Japanese Patent No. 6149081 describes a quick connector including a connector main body and a retainer formed separately from the connector main body. The retainer moves from an initial position to a confirmation position with a pressing operation at the initial position, and the retainer located at the confirmation position prevents the pipe from being removed.

Japanese Patent No. 3702671 describes a quick connector including a connector main body and a retainer formed separately from the connector main body. The retainer is inserted from the opening side of the connector main body in an axial direction and is mounted in the connector main body. In this state, when a pipe is inserted, an annular protrusion of the pipe is locked to the retainer. On the other hand, when the pipe is released, the pipe is pulled out from the connector main body together with the retainer.

In the quick connectors described in Japanese Patent No. 4937426 and Japanese Patent No. 4871749, since the connector housing and the retainer are integrated, they are formed of the same material. Since required functions of the connector housing and the retainer are different from each other, it is desirable to form them of different materials, but this is not easy in the quick connectors with these configurations.

In the quick connector described in Japanese Patent No. 6149081, it is necessary to move the retainer from the initial position to the confirmation position in order to reliably prevent the pipe from being removed. It is desirable to prevent the pipe from being removed without an operation for moving the retainer.

Since the quick connector described in Japanese Patent No. 3702671 has the structure in which the retainer is inserted into the connector main body from the opening of the connector main body in the axial direction, it is necessary to secure a shaft length of the retainer. Therefore, the shaft length of the connector main body becomes long. It is desirable to reduce a size of the quick connector by shortening the shaft length of the connector main body.

SUMMARY OF INVENTION

The present disclosure to provide a quick connector which can have a reduced size, and in which a connector main body and a retainer are formed separately, and a pipe can be prevented from being removed without requiring an operation of the retainer.

According to one embodiment of the present disclosure, a quick connector includes a connector main body into which a pipe with an annular protrusion is able to be inserted, and a retainer which is formed separately from the connector main body, is disposed in the connector main body to be movable from a standard position in a prescribed direction intersecting an axial direction of the connector main body, and prevents the pipe from being removed by locking the pipe in the axial direction with respect to the annular protrusion in a state in which the pipe is inserted at a normal position of the connector main body.

In one embodiment, the retainer includes a base part, and a pair of first leg parts which is provided on the base part to be expandable and deformable so that the annular protrusion is allowed to pass therethrough in an expanded and deformed state, and is locked to the annular protrusion in the axial direction in a state in which the retainer is located at the standard position and does not expand.

In one embodiment, the first leg part further includes a tapered surface which is formed on a surface on which the pipe is inserted and is allowed to come into contact with the annular protrusion when the pipe is inserted into the connector main body, and a locking surface which is formed on a surface opposite to a side on which the pipe is inserted and is locked to the annular protrusion. The connector main body further includes a first guide which is allowed to come into contact with the first leg part and expands and deforms the first leg part by moving the retainer in the prescribed direction.

When the pipe is inserted into the connector main body, the first leg part is expanded and deformed by a pressing force on the tapered surface in the axial direction by the annular protrusion, and the annular protrusion of the pipe is allowed to pass through the first leg part in an insertion direction by expansion and deformation of the first leg part. When the pipe is released from the normal position of the connector main body, the first leg part comes into contact with the first guide to be expanded and deformed by operating the retainer to move from the standard position in the prescribed direction, and the annular protrusion of the pipe is allowed to pass through the first leg part in a release direction by expansion and deformation of the first leg part.

As described above, in the quick connector, the connector main body and the retainer are formed separately. Thus, the connector main body and the retainer can be formed of different materials. Further, the retainer is configured to be movable in a prescribed direction intersecting the axial direction of the connector main body. Thus, a size of the quick connector can be reduced. Further, the retainer can prevent the pipe from being removed in a standard state in which an operator does not perform any movement operation of the retainer.

Figure 1:
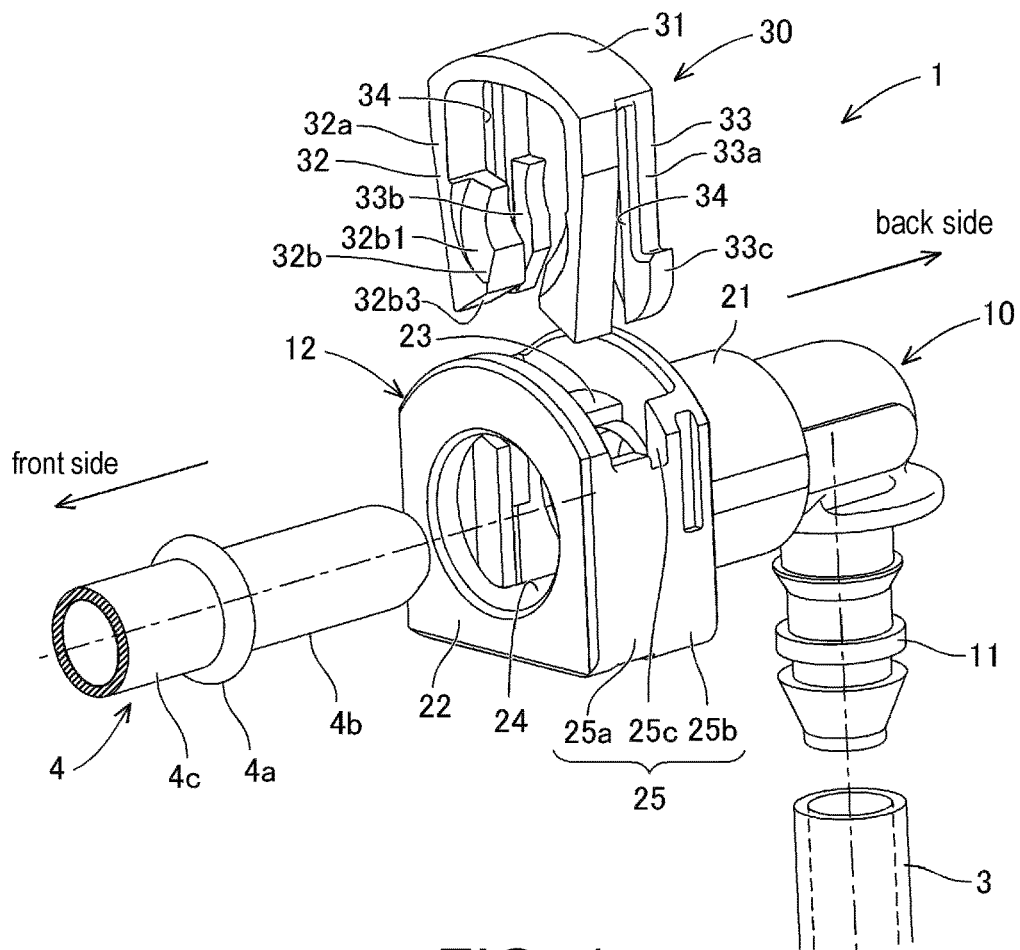
FIG. 1 is a perspective view of a state before a connector main body 10 and a retainer 30 which constitute a quick connector 1 of a first example, a resin pipe 3, and a metal pipe 4 are assembled.

DESCRIPTION OF EMBODIMENTS (1. Outline of Quick Connector 1 of First Example)

An outline of a quick connector 1 of a first example will be described with reference to FIG. 1. The quick connector 1 constitutes, for example, a part of a fuel pipe of an automobile and forms a flow path for distributing a fuel. The quick connector 1 is mainly formed of a resin. The quick connector 1 connects two pipes 3 and 4.

One end of the quick connector 1 is connected to, for example, a resin pipe 3 (also referred to as a resin tube). The resin pipe 3 is externally mounted on one end of the quick connector 1 in a state in which a diameter thereof is expanded and deformed along a shape of an outer peripheral surface of one end of the quick connector 1. One end of the quick connector 1 and the resin pipe 3 are prevented from being removed by a frictional locking force therebetween.

The other end of the quick connector 1 is connected to, for example, a metal pipe 4. The tip end side of the metal pipe 4 is inserted through an opening at the other end of the quick connector 1. The metal pipe 4 has an annular protrusion 4a (also referred to as a bead or a flange part) formed to protrude radially outward at a position away from the tip end thereof in an axial direction. The pipe 4 has a tip end part 4b having a small diameter part on the tip end side from the annular protrusion 4a and an intermediate part 4c having a small diameter part on the side opposite to the tip end side of the annular protrusion 4a. The pipe 4 is prevented from being removed by the annular protrusion 4a being locked to the quick connector 1 in the axial direction.

(2. Overall Configuration of Quick Connector 1 of First Example)

The overall configuration of the quick connector 1 of the first example will be described with reference to FIG. 1. The quick connector 1 includes a connector main body 10 and a retainer 30. In this example, the connector main body 10 and the retainer 30 are formed separately.

Here, an axial direction, a vertical direction, and a left and right direction used in the following description will be defined. The axial direction is an axial direction of the pipe 4 when the metal pipe 4 is inserted into the quick connector 1. In the connector main body 10, the side on which the pipe 4 is inserted is the front side (corresponding to the pipe insertion side) in the axial direction, and the side opposite thereto is the back side (corresponding to the pipe anti-insertion side) in the axial direction. A downward direction is a press-in direction of the retainer 30 when seen in the axial direction of the pipe 4, and an upward direction is a pulling-out direction (a counter-press-in direction) of the retainer 30. The left and right direction is a direction orthogonal to the vertical direction when seen in the axial direction of the pipe 3.

The connector main body 10 is formed in a tubular shape. For example, the connector main body 10 can have various shapes such as an L-shape and a linear shape. One end of the connector main body 10 is formed in a shape which allows the resin pipe 3 to be externally mounted thereon. The other end of the connector main body 10 is formed in a shape into which the metal pipe 4 can be inserted. Here, the connector main body 10 exerts a locking force (a removal preventing force) with respect to the resin pipe 3. On the other hand, the connector main body 10 does not exert the locking force (the removal preventing force) on the metal pipe 4. That is, the connector main body 10 does not have an element which restricts the annular protrusion 4a of the pipe 4 in a direction in which the pipe 4 is removed.

The connector main body 10 may be formed of one member or may be formed by joining a plurality of members. The connector main body 10 is formed of a resin having impact resistance, heat resistance, chemical resistance, and the like. The connector main body 10 is formed of, for example, glass fiber reinforced polyamide.

The retainer 30 is formed separately from the connector main body 10. The retainer 30 is mounted in the connector main body 10 by being inserted into the connector main body 10 in a direction intersecting the axial direction of the connector main body 10. The retainer 30 is disposed in the connector main body 10 to be movable in a prescribed direction (the downward direction) intersecting the axial direction of the connector main body 10 from a standard position at which it is mounted. Further, the retainer 30 prevents the pipe 4 from being removed by being locked to the annular protrusion 4a of the metal pipe 4 in the axial direction in a state in which the metal pipe 4 is inserted at a normal position of the connector main body 10.

The retainer 30 is formed of a resin having, at least, heat resistance, chemical resistance, and the like. The retainer 30 is formed of, for example, polyamide. The retainer 30 can be formed of a material having impact resistance lower than that of the connector main body 10. Therefore, the retainer 30 can be formed at a lower cost by being formed of a material different from that of the connector main body 10. However, the retainer 30 may be formed of the same material as the connector main body 10.

(3. Details of Constituent Components of Quick Connector 1 of First Example)

As described above, the quick connector 1 of the first example includes the connector main body 10 and the retainer 30. However, the quick connector 1 includes a seal unit (not shown) inside the connector main body 10. Since the seal unit is known, detailed description thereof will be omitted.

(3-1. Configuration of Connector Main Body 10)

A configuration of the connector main body 10 will be described with reference to FIGS. 1 to 3. The connector main body 10 includes a first connection part 11 on which the resin pipe 3 is externally mounted and a second connection part 12 into which the metal pipe 4 is inserted. The first connection part 11 is provided on one end side (the lower back side in FIG. 1) of the connector main body 10, and the resin pipe 3 is externally mounted on the first connection part 11. An outer peripheral surface of the first connection part 11 is formed in a stepped manner in a direction along a flow path so that the resin pipe can have the removal preventing force in a state in which it is fitted thereto.

The second connection part 12 is provided on the other end side (the upper side of FIG. 1) of the connector main body 10, and portions of the tip end part 4b and the annular protrusion 4a of the metal pipe 4 can be inserted therein. The second connection part 12 is formed in a tubular shape into which the metal pipe 4 can be inserted, and has a hole through which a portion of the metal pipe 4 on the insertion side (the front side) passes in a direction intersecting the axial direction of the pipe 4 (the vertical direction in FIG. 1).

The seal unit (not shown) is disposed on the inner peripheral side of the second connection part 12. For example, the seal unit is configured of a plurality of annular seal members formed of fluororubber, a resin collar disposed to be sandwiched between the plurality of annular seal members in the axial direction, a resin bush which position the annular seal members and the collar on the connector main body. The seal unit seals between an inner peripheral surface of the second connection part 12 and an outer peripheral surface of the tip end part 4b of the metal pipe 4 in a radial direction.

Figure 2:
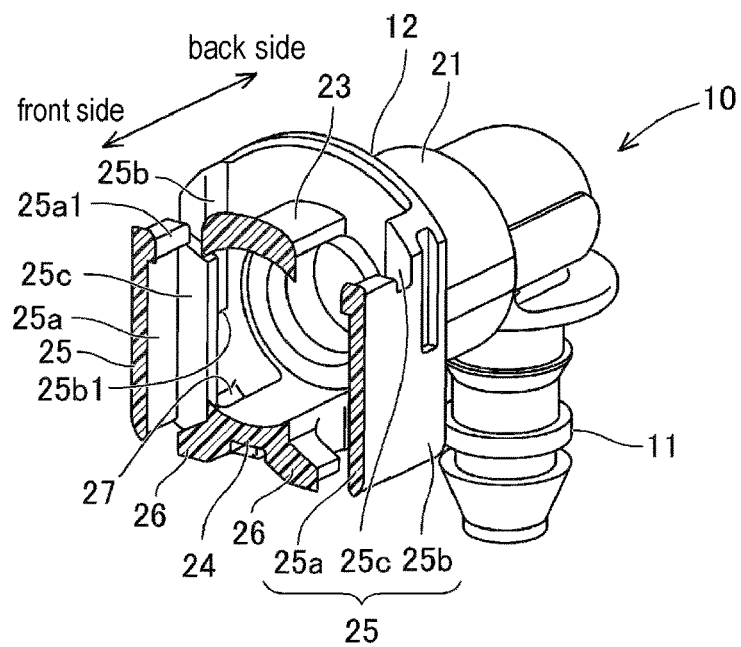
FIG. 2 is a perspective view of the connector main body 10 in which a front portion thereof is partially cut.
Figure 3:
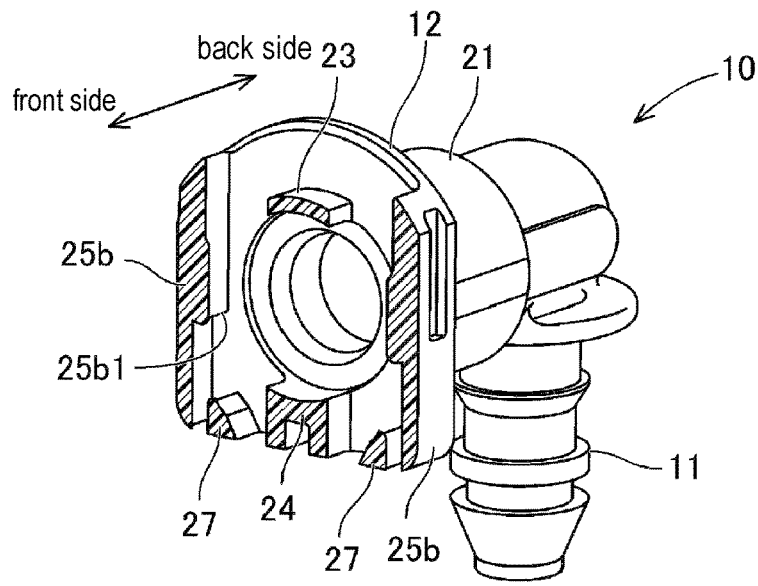
FIG. 3 is a perspective view of the connector main body 10 in which the front portion thereof is partially cut at a position on the back side of FIG. 2.

As shown in FIGS. 1 to 3, the second connection part 12 includes a tubular part 21 disposed on the back side. The first connection part 11 is connected to an end part of the tubular part 21. The seal unit is disposed in the tubular part 21, and the tip end part 4b of the metal pipe 3 is inserted therein. As shown in FIG. 3, a front end surface of the tubular part 21 is formed in a flange shape which extends outward from a circular opening in the radial direction.

As shown in FIG. 1, the second connection part 12 further includes an insertion opening surface 22 which is coaxially disposed at a distance from the front end surface of the tubular part 21 to the front side in the axial direction. The insertion opening surface 22 is formed to have the same exterior as that of the front end surface of the tubular part 21, and faces in the axial direction. A circular hole is formed in a center of the insertion opening surface 22.

As shown in FIGS. 2 and 3, the second connection part 12 further includes an upper connection part 23 and a lower connection part 24 which connect the front end surface of the tubular part 21 to the insertion opening surface 22. The upper connection part 23 connects an upper position of a hole in the front end surface of the tubular part 21 to an upper position of a hole in the insertion opening surface 22. The upper connection part 23 is formed at a position having a distance downward from an upper edge of the front end surface of the tubular part 21. Similarly, lower connection part 24 is formed at a position having a distance downward from an upper edge of the insertion opening surface 22. The lower connection part 24 connects a lower position of the hole in the front end surface of the tubular part 21 to a lower position of the hole in the insertion opening surface 22. In particular, the lower connection part 24 is formed on a lower edge of the front end surface of the tubular part 21 and a lower edge of the insertion opening surface 22.

As shown in FIGS. 1 to 3, the second connection part 12 further includes a pair of wall parts 25 and 25 which connects the side of the front end surface of the tubular part 21 and the side of the insertion opening surface 22 to each other. Each of the pair of wall parts 25 and 25 has a distance from the upper connection part 23 in the left and right direction and has a distance from the lower connection part 24 in the left and right direction. The pair of wall parts 25 and 25 includes first wall parts 25a and 25a connected to the insertion opening surface 22, second wall parts 25b and 25b connected to the front end surface of the tubular part 21, and partition walls 25c and 25c located between the first wall parts 25a and 25a and the second wall parts 25b and 25b.

As shown in FIG. 2, the first wall parts 25a and 25a are respectively formed in a plate shape which extends in the vertical direction. First restriction parts 25a1 and 25a1 which protrude to the inner surface side are provided at upper ends of the first wall parts 25a and 25a. As shown in FIG. 3, the second wall parts 25b and 25b are respectively formed in a plate shape which extends in the vertical direction. Second restriction parts 25b1 and 25b1 which protrude to the inner surface side are provided at intermediate parts of the second wall parts 25b and 25b in the vertical direction. As shown in FIG. 2, the partition walls 25c and 25c are formed to protrude to the inner surface side further than the inner surfaces of the first wall parts 25a and 25a and the inner surfaces of the second wall parts 25b and 25b.

As shown in FIG. 2, the second connection part 12 further includes first guides 26 and 26. The first guides 26 and 26 are formed to protrude from both side surfaces of the lower connection part 24 toward the first wall parts 25a and 25a. The first guides 26 and 26 have a distance from the first wall parts 25a and 25a. Upper surfaces of the first guides 26 and 26 are inclined so that normal lines thereof face upward and outward. That is, the upper surfaces of the first guides 26 and 26 are inclined downward from the lower connection part 24 side toward the side.

As shown in FIG. 3, the second connection part 12 further includes second guides 27 and 27. The second guides 27 and 27 are disposed with a distance between the lower connection part 24 and the second wall parts 25b and 25b. The inner surface sides of the second guides 27 and 27 are inclined so that normal lines thereof face upward and inward.

(3-2. Configuration of Retainer 30)

Figure 4:
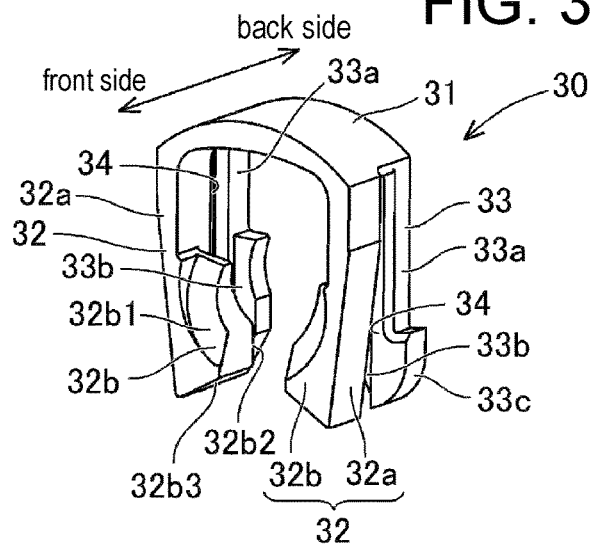
FIG. 4 is a perspective view of the retainer 30 from the front side.
Figure 5:
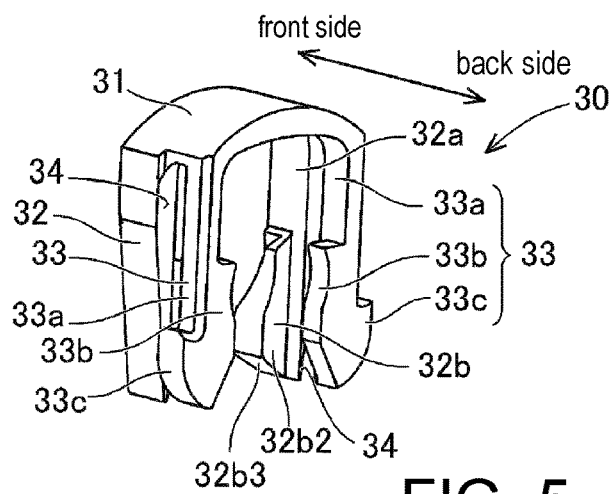
FIG. 5 is a perspective view of the retainer 30 from the back side.

A configuration of the retainer 30 will be described with reference to FIGS. 1, 4 and 5. As shown in FIG. 1, the retainer 30 is disposed in a hole which passes through the second connection part 12 of the connector main body 10 in a direction intersecting the axial direction of the second connection part 12. Therefore, the retainer 30 is configured to be movable in the direction intersecting the axial direction which is not coaxial with the axial direction of the second connection part 12 of the connector main body 10. Thus, the retainer 30 itself and a portion of the connector main body 10 for disposing the retainer 30 can be miniaturized. As a result, a size of the quick connector 1 can be reduced.

The retainer 30 is formed in an inverted U shape. The retainer 30 includes a base part 31, a pair of first leg parts 32 and 32, and a pair of second leg parts 33 and 33. The base part 31 is located at the top of the inverted U shape and is formed in a slightly curved plate shape.

The pair of first leg parts 32 and 32 is provided on the front side of the base part 31 to be expandable and deformable at both left and right ends of the base part 31. The first leg parts 32 and 32 allow the annular protrusion 4a of the metal pipe 4 to pass therethrough in a state in which they are expanded and deformed. On the other hand, the first leg parts 32 and 32 are locked to the annular protrusion 4a in the axial direction in a state in which they are not expanded. The first leg parts 32 and 32 include a first leg part main body 32a and a first leg part protrusion 32b.

The first leg part main body 32a is formed in a rod shape which extends downward from both left and right ends of the base part 31. The tip end side of the first leg part main body 32a is slightly bent or curved toward the facing surface side (the inner side). The first leg part protrusion 32b is provided to protrude from the tip end side of the first leg part main body 32a to the facing surface side (the inner side). The first leg part protrusion 32b has a tapered surface 32b1 which is a surface on the side (the front side) on which the pipe 4 is inserted and a locking surface 32b2 which is a surface on the side (the back side) opposite to the side on which the pipe 4 is inserted.

The tapered surface 32b1 can come into contact with the annular protrusion 4a when the pipe 4 is inserted into the connector main body 10. The tapered surface 32b1 is inclined not only in a prescribed direction (the vertical direction) in which the retainer 30 moves with respect to the connector main body 10 but also in a direction in which the first leg part 32 expands. That is, a normal line of the tapered surface 32b1 faces upward while facing the front side, and faces the facing surface side (the inner side). The locking surface 32b2 is formed in a plane shape substantially orthogonal to the axial direction.

A lower surface 32b3 of the first leg part protrusion 32b is formed so that a normal line thereof faces downward and the facing surface side (the inner side). The lower surface 32b3 of the first leg part protrusion 32b can come into contact with the first guide 26 and is guided by the first guide 26.

The pair of second leg parts 33 and 33 is provided on the back side of the base part 31 to be expandable and deformable at both left and right ends of the base part 31. The second leg parts 33 and 33 are provided independent of the first leg parts 32 and 32. The second leg parts 33 and 33 are provided on the side (the back side) opposite to the side on which the pipe 4 is inserted with respect to the first leg parts 32 and 32. That is, slits 34 and 34 are formed between the first leg parts 32 and 32 and the second leg parts 33 and 33 in the axial direction.

The second leg parts 33 and 33 have a function of restricting upward movement (in a direction opposite to the prescribed direction) from the connector main body 10 and a function of returning the retainer 30 to a standard position. The second leg parts 33 and 33 include a second leg part main body 33a, a second leg part inner protrusion 33b, and a second leg part outer protrusion 33c.

The second leg part main body 33a is formed in a rod shape which extends linearly downward from both left and right ends of the base part 31. The second leg part main bodies 33a are formed to be elastically deformable, and are elastically deformable in a direction in which tip ends thereof approach each other. That is, the second leg part main body 33a is elastically deformed in a direction opposite to a direction in which the first leg part main body 32a is elastically deformed.

The second leg part inner protrusion 33b is provided to protrude from the tip end side of the second leg part main body 33a to the facing surface side (the inner side). The second leg part inner protrusion 33b can come into contact with the annular protrusion 4a of the pipe 4 and is locked to the annular protrusion 4a in the axial direction. Both end surfaces of the second leg part inner protrusion 33b in the axial direction are formed in a plane shape substantially orthogonal to the axial direction. A lower surface of the second leg part inner protrusion 33b is formed so that a normal line thereof faces downward and the facing surface side (the inner side).

The second leg part outer protrusion 33c (a restriction part) is provided to protrude from the tip end side of the second leg part main body 33a to the side (the outer side) opposite to the facing surface. The second leg part outer protrusion 33c is locked to the second restriction parts 25b1 and 25b1 of the second wall parts 25b and 25b. That is, the second leg part outer protrusion 33c has a function of restricting movement of the retainer 30 from the connector main body 10 in the direction opposite to the prescribed direction.

Further, a lower surface of the second leg part outer protrusion 33c is formed so that a normal line thereof faces downward and toward the side (the outer side) opposite to the facing surface. The lower surface of the second leg part outer protrusion 33c can come into contact with the second guide 27 and is guided by the second guide 27.

(4. Explanation of Operation when Pipe is Inserted)

An operation until the metal pipe 4 is inserted into the quick connector 1 and the pipe 4 is completely locked by the retainer 30 will be described.

(4-1. State Before Pipe is Inserted)

First, a state before the pipe is inserted will be described with reference to FIGS. 6A to 6E. The state before the pipe is inserted is a state in which the retainer 30 is located at a standard position with respect to the connector main body 10 and the pipe 4 is before being inserted into the connector main body 10.

The retainer 30 is mounted from above between the front end surface of the tubular part 21 of the connector main body 10 and the insertion opening surface 22 in the axial direction. That is, the pair of first leg parts 32 and 32 and the pair of second leg parts 33 and 33 are pressed to straddle the upper connection part 23. As shown in FIGS. 6B to 6E, the base part 31 is located above the upper connection part 23 with a gap therebetween. A separation distance between the base part 31 and the upper connection part 23 in the vertical direction is a distance at which the retainer 30 can move downward (in the prescribed direction).

Figure 6A:
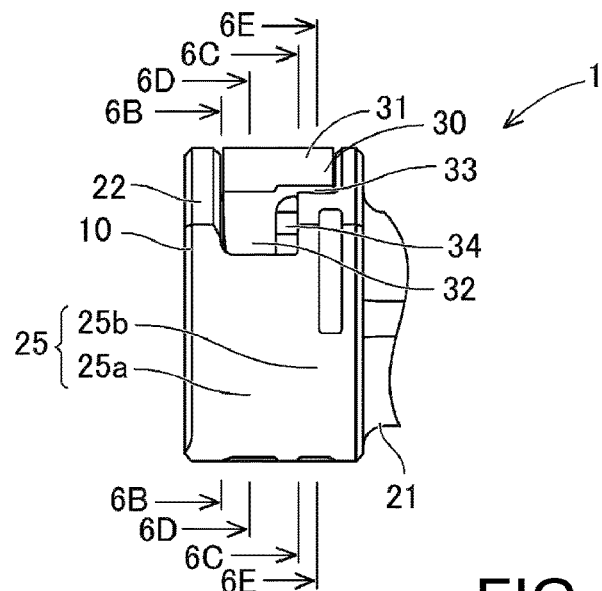
FIG. 6A is a side view of the quick connector 1 in a state before the pipe is inserted.
Figure 6B:
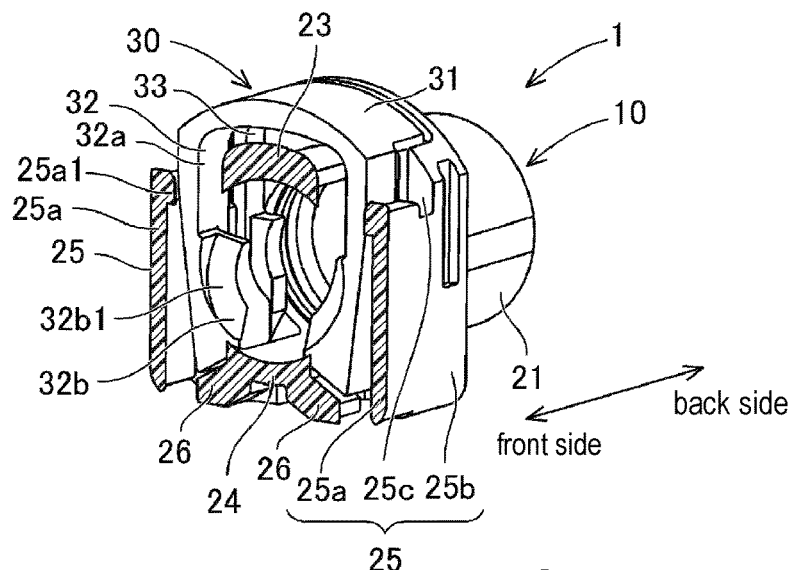
FIG. 6B is a perspective view along line 6B-6B of FIG. 6A.
Figure 6C:
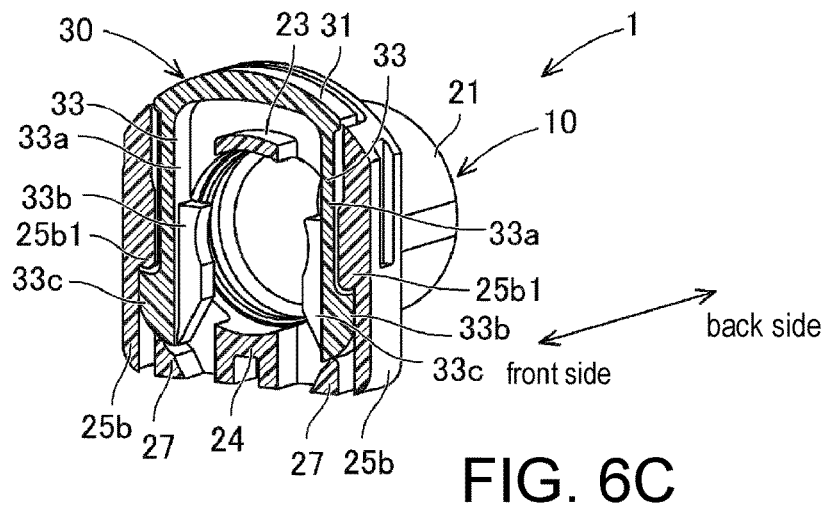
FIG. 6C is a perspective view along line 6C-6C of FIG. 6A.
Figure 6D:
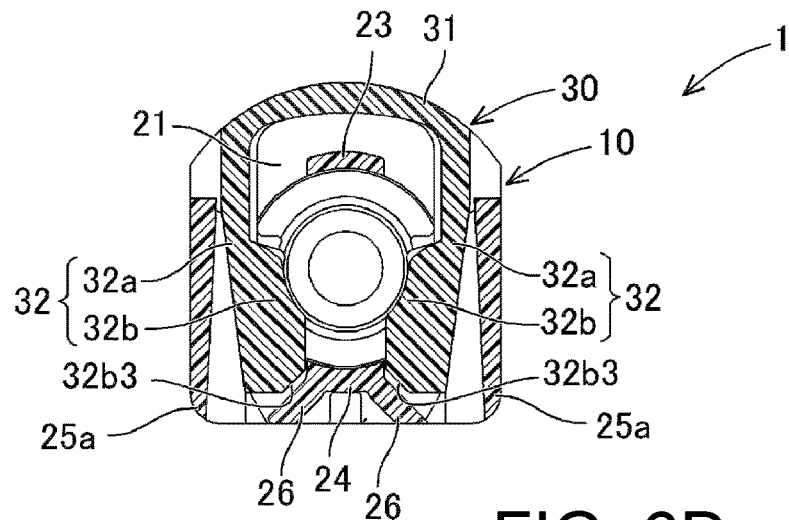
FIG. 6D is a cross-sectional view along line 6D-6D of FIG. 6A.

Then, as shown in FIGS. 6B and 6D, the first wall parts 25a and 25a protect the first leg parts 32 and 32 from the outside by being disposed to face outer surfaces of the first leg parts 32 and 32 and reducing exposed surfaces of the first leg parts 32 and 32. Further, as shown in FIGS. 6B and 6D, an upper portion of an outer surface of the first leg part main body 32a is disposed to have a slight gap with respect to tip end surfaces of the first restriction parts 25a1 and 25a1 of the first wall parts 25a and 25a or to be in contact therewith. Therefore, a posture of the first leg part main body 32a is restricted by the first restriction parts 25a1 and 25a1. On the other hand, a lower portion of the outer surface of the first leg part main body 32a has a large gap with respect to the first wall parts 25a and 25a. The tip end side of the first leg part main body 32a is allowed to be expanded and deformed by the gap with respect to the first wall parts 25a and 25a. In other words, the first wall parts 25a and 25a restrict an amount of expansion and deformation of the first leg part 32 to a prescribed amount.

As shown in FIG. 6B, the tapered surface 32b1 of the first leg part protrusion 32b of the first leg part 32 faces the insertion opening surface 22 side. Then, most of the tapered surface 32b1 is located at a position visible from a hole in the insertion opening surface 22. The lower surface 32b3 (the tip end of the first leg part 32) of the first leg part protrusion 32b faces the first guide 26 with a gap therebetween.

Figure 6E:
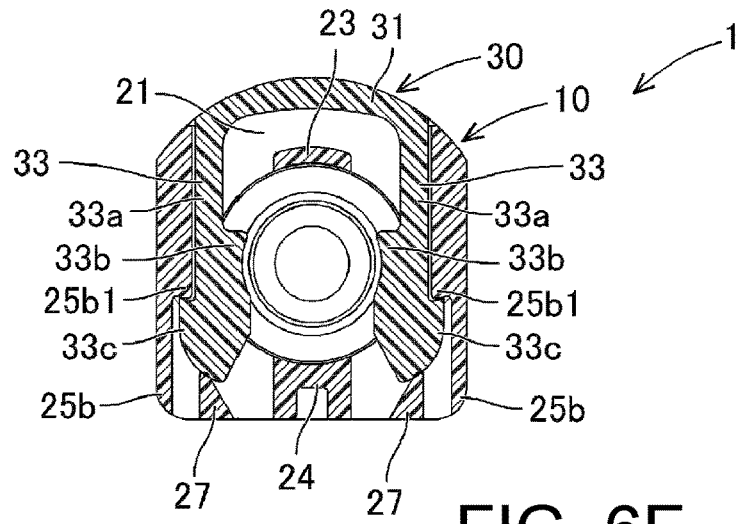
FIG. 6E is a cross-sectional view along line 6E-6E of FIG. 6A.

Further, as shown in FIGS. 6C and 6E, the second wall parts 25b and 25b protect the second leg parts 33 and 33 from the outside by being disposed to face outer surfaces of the second leg parts 33 and 33 and reducing exposed surfaces of the second leg parts 33 and 33. The second leg part main body 33a is disposed to have a slight gap with respect to the second wall parts 25b and 25b. Therefore, the expansion and deformation of the second leg part main body 33a are restricted by the second wall parts 25b and 25b.

Further, the second leg part outer protrusion 33c is locked to the second restriction parts 25b1 and 25b1 of the second wall parts 25b and 25b. Thus, movement of the retainer 30 in a pulling-out direction (opposite to the prescribed direction) with respect to the connector main body 10 is restricted. Further, the lower surface of the second leg part outer protrusion 33c faces the second guide 27. Further, the partition walls 25c and 25c are inserted into the slits 34 and 34. As a result, the posture of the retainer 30 is maintained.

(4-2. Partially Inserted Pipe State)

A partially inserted pipe state will be described with reference to FIGS. 7A and 7B and 8A and 8B. The partially inserted pipe state is a state in which a part of the pipe 4 is inserted, and a middle state in which the pipe 4 is located on the front side from the normal position in the axial direction.

Figure 7A:
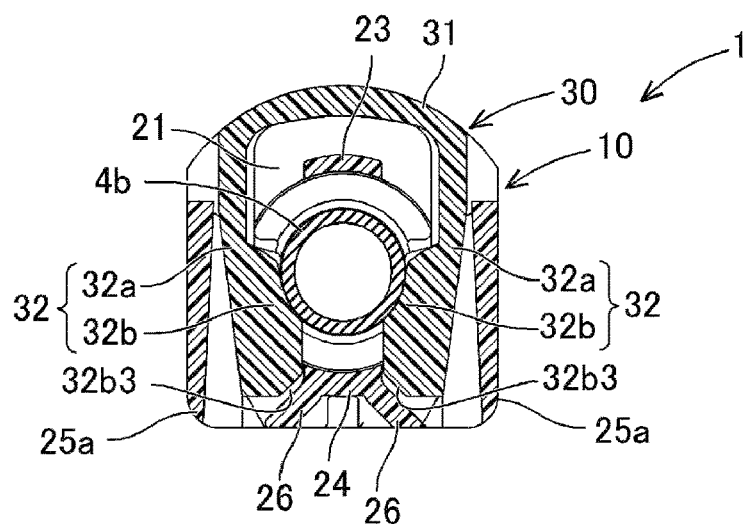
FIG. 7A is a cross-sectional view of the quick connector 1 in a first state in which a pipe is partially inserted, and is a view corresponding to FIG. 6D.
Figure 7B:
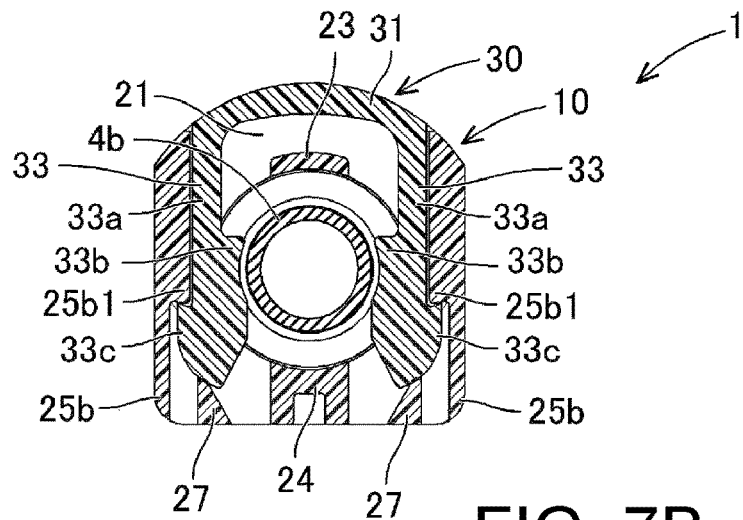
FIG. 7B is a cross-sectional view of the quick connector 1 in the first state in which the pipe is partially inserted, and is a view corresponding to FIG. 6E.

A state in which only the tip end part 4b of the pipe 4 is inserted into the connector main body 10 is shown in FIGS. 7A and 7B. At this time, the tip end part 4b of the pipe 4 is about the same as an inscribed circle of the first leg part protrusion 32b of the first leg part 32. Therefore, the first leg part 32 is in a state in which a diameter thereof is not expanded and deformed at all, or even when the diameter is expanded and deformed, the diameter is expanded and deformed very slightly. Similarly, the tip end part 4b of the pipe 4 is about the same as an inscribed circle of the second leg part inner protrusion 33b of the second leg part 33. Therefore, the second leg part 33 is in a state in which the diameter thereof is not expanded and deformed at all, or even when the diameter is expanded and deformed, the diameter is expanded and deformed very slightly. That is, in the state in which only the tip end part 4b of the pipe 4 is inserted into the connector main body 10, the retainer 30 is in the same position and posture as the state before the pipe is inserted.

Figure 8A:
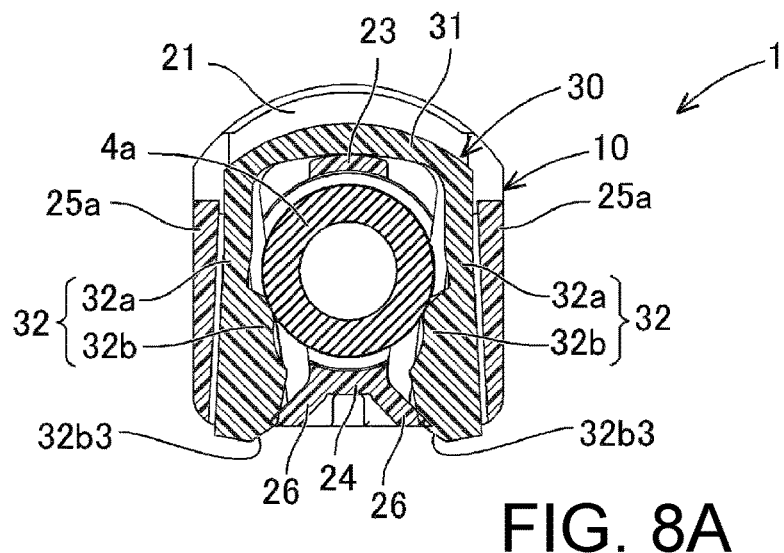
FIG. 8A is a cross-sectional view of the quick connector 1 in a second state in which the pipe is partially inserted, and is a view corresponding to FIG. 6D.
Figure 8B:
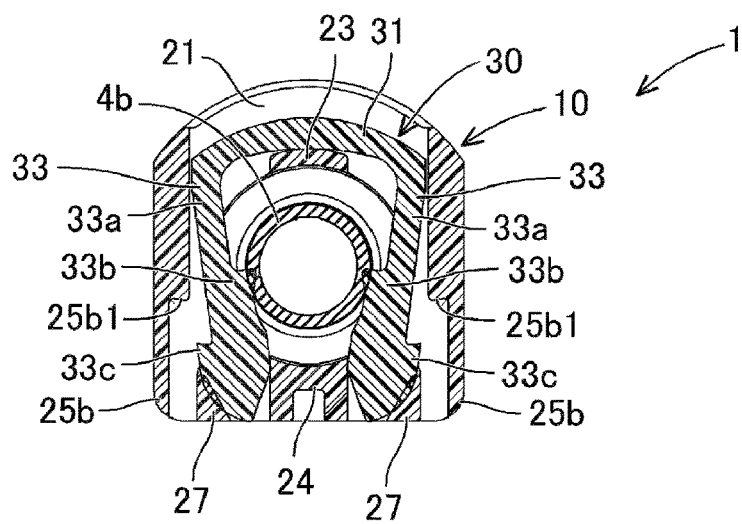
FIG. 8B is a cross-sectional view of the quick connector 1 in the second state in which the pipe is partially inserted, and is a view corresponding to FIG. 6E.

A state in which the pipe 4 is further deeply inserted into the connector main body 10 is shown in FIGS. 8A and 8B. FIGS. 8A and 8B show a state in which the annular protrusion 4a of the pipe 4 is located at the position of the first leg part 32.

When the pipe 4 is further inserted to the back side, the annular protrusion 4a of the pipe 4 comes into contact with the tapered surface 32b1 of the first leg part protrusion 32b of the first leg part 32. Then, a pressing force in the axial direction acts on the tapered surface 32b1 due to the annular protrusion 4a. Here, the partition walls 25c and 25c are located on the back side of the first leg part main body 32a. Therefore, the deformation of the first leg part 32 in the axial direction is restricted by the partition walls 25c and 25c.

Then, a normal line of the tapered surface 32b1 of the first leg part protrusion 32b faces upward while facing the front side, and faces the facing surface side (the inner side). Therefore, due to the pressing force on the tapered surface 32b1 in the axial direction by the annular protrusion 4a, a force in an expansion direction and a downward force act on the tapered surface 32*b*1. As shown in FIG. 8A, the tip end side of the first leg part 32 is expanded and deformed by the force acting on the tapered surface 32*b*1 in the expansion direction. Further, the retainer 30 moves downward (in a press-in direction) from the standard position with respect to the connector main body 10 due to the downward force acting on the tapered surface 32*b*1.

Here, when the retainer 30 moves downward from the standard position with respect to the connector main body 10, as shown in FIG. 8A, the lower surface 32*b*3 of the first leg part protrusion 32*b* of the first leg part 32 comes into contact with the first guide 26. Here, the first guide 26 is inclined in a direction in which the first leg part 32 expands. Therefore, the first leg part 32 is further expanded and deformed by the lower surface 32*b*3 of the first leg part protrusion 32*b* coming into contact with the first guide 26. The annular protrusion 4*a* of the pipe 4 can pass through the first leg part 32 in the insertion direction due to the expansion and deformation of the first leg part 32 in this way.

As described above, as shown in FIG. 8A, the retainer 30 moves downward from the standard position with respect to the connector main body 10. Therefore, the second leg part 33 also moves downward. At this time, as shown in FIG. 8B, the lower surface of the second leg part outer protrusion 33*c* is guided in a state in which it is in contact with the second guide 27. The second guide 27 is inclined in a direction in which the tip ends of the second leg parts 33 approach each other when the retainer 30 moves downward. Therefore, the second leg parts 33 are guided by the second guide 27 and are elastically deformed in the direction in which the tip ends thereof approach each other. The second leg part 33 accumulates elastic return energy for the retainer 30 to return to the standard position due to the elastic deformation of the second leg part 33.

In particular, in addition to the expansion and deformation of the first leg part 32, the second leg parts 33 are elastically deformed on the side opposite to a deformation direction of the first leg part 32, that is, in a direction in which the tip ends thereof approach each other. That is, while the force in a direction in which the first leg part 32 expands acts, the force in the direction in which the tip ends of the second leg parts 33 approach each other acts on the base part 31. Since both forces act on the base part 31 to be offset, the elastic return energy accumulated in the second leg part 33 is not diminished by the expansion and deformation of the first leg part 32. Therefore, the elastic return energy accumulated in the second leg part 33 can be set to a sufficiently large value.

(4-3. Pipe Insertion Complete State)

Figure 9A:
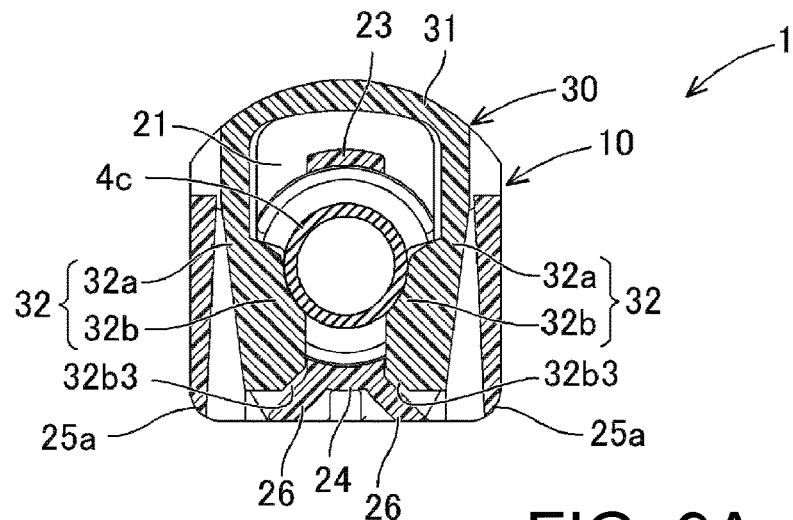
FIG. 9A is a cross-sectional view of the quick connector 1 in a state in which the pipe is completely inserted, and is a view corresponding to FIG. 6D.
Figure 9B:
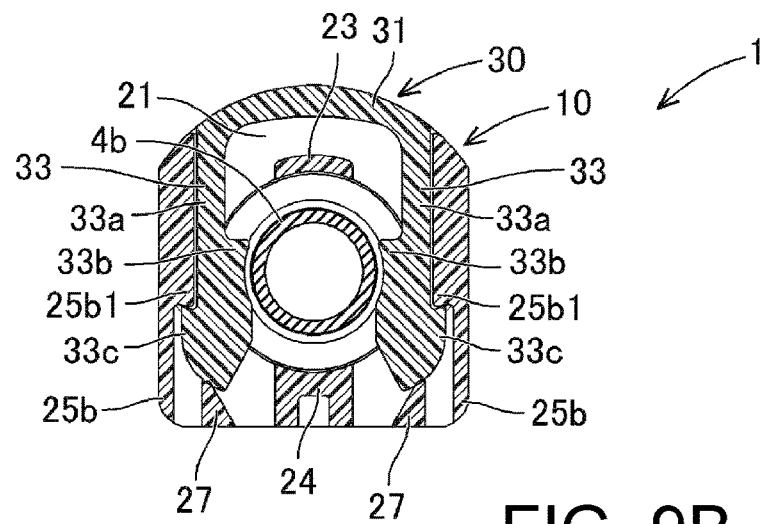
FIG. 9B is a cross-sectional view of the quick connector 1 in the state in which the pipe is completely inserted, and is a view corresponding to FIG. 6E.

A pipe insertion complete state will be described with reference to FIGS. 9A and 9B. The pipe insertion complete state is a state in which the retainer 30 is located at the standard position and the pipe 4 is located at the normal position.

The pipe 4 is further inserted to the back side from the partially inserted pipe state shown in FIGS. 8A and 8B. Then, the annular protrusion 4*a* passes through the first leg part 32 and reaches the gap between the first leg part 32 and the second leg part 33 in the axial direction. A state in which the annular protrusion 4*a* is located at the relevant position is a state in which the pipe 4 is located at the normal position.

Due to the annular protrusion 4*a* passing through the first leg part 32, the pressing force from the annular protrusion 4*a* does not act on the first leg part 32. Therefore, neither the force in the direction in which the diameter expands nor the force in the downward direction acts on the first leg part 32. Therefore, the first leg part 32 returns from an expanded and deformed state to an original state. That is, an amount of expansion of the diameter of the first leg part 32 becomes zero.

Then, in a state in which the retainer 30 has moved downward from the standard position, the second leg parts 33 are elastically deformed in the direction in which the tip ends thereof approach each other, and the elastic return energy is accumulated. Therefore, when the force in the downward direction does not act on the first leg part 32, the retainer 30 returns to the standard position due to a force in an upward direction acting on the second leg part 33.

In a state in which the retainer 30 returns to the standard position, the annular protrusion 4*a* is sandwiched between the first leg part protrusion 32*b* of the first leg part 32 and the second leg part inner protrusion 33*b* of the second leg part 33 in the axial direction, and thus the pipe 4 is positioned in the axial direction. Then, the annular protrusion 4*a* is in a state in which it faces the locking surface 32*b*2 of the first leg part protrusion 32*b* of the first leg part 32. The pipe 4 is locked to the retainer 30 by locking the locking surface 32*b*2 to the annular protrusion 4*a* in this way.

As described above, when the pipe 4 is inserted into the normal position, an operator simply inserts the pipe 4 without performing any movement operation of the retainer 30. This is because the pipe 4 can be prevented from being removed in a standard state in which the retainer 30 does not perform any operation. Therefore, mountability of the pipe 4 becomes very good.

(5. Explanation of Operation at the Time of Release)

Figure 10A:
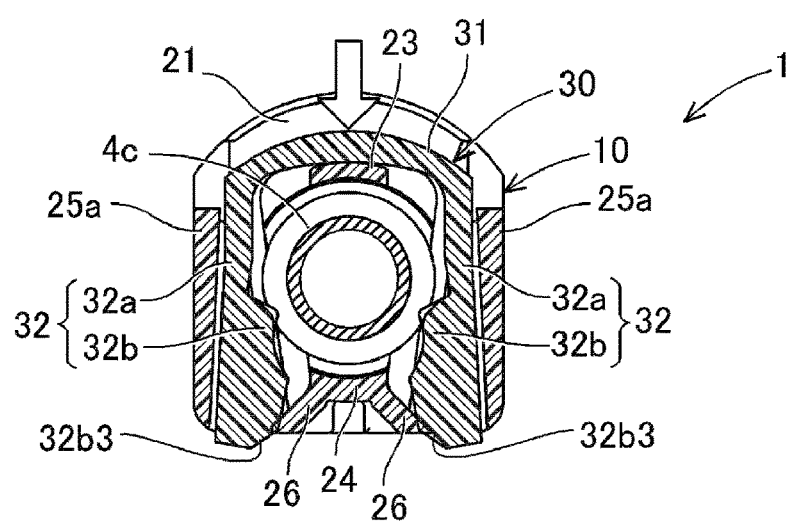
FIG. 10A is a cross-sectional view of the quick connector 1 in an initial release state, and is a view corresponding to FIG. 6D.

An operation in which the pipe 4 is released from the normal position in the state in which the metal pipe 4 is inserted into the quick connector 1 will be described with reference to FIGS. 10A and 10B and 11A and 11B. When the pipe 4 is released from the normal position, the operator first operates the retainer 30 to move it downward (in the press-in direction, the prescribed direction) from the standard position. Then, as shown in FIGS. 10A and 10B, the retainer 30 moves.

The base part 31 can be moved to a position at which it comes into contact with the upper connection part 23. When the retainer 30 is pressed downward, the lower surface 32*b*3 of the first leg part protrusion 32*b* of the first leg part 32 comes into contact with the first guide 26. Here, the first guide 26 is inclined in the direction in which the first leg part 32 expands. Therefore, the first leg part 32 is expanded and deformed by the lower surface 32*b*3 of the first leg part protrusion 32*b* coming into contact with the first guide 26. The annular protrusion 4*a* of the pipe 4 can pass through the first leg part 32 in a release direction from the normal position due to the expansion and deformation of the first leg part 32 in this way.

Figure 10B:
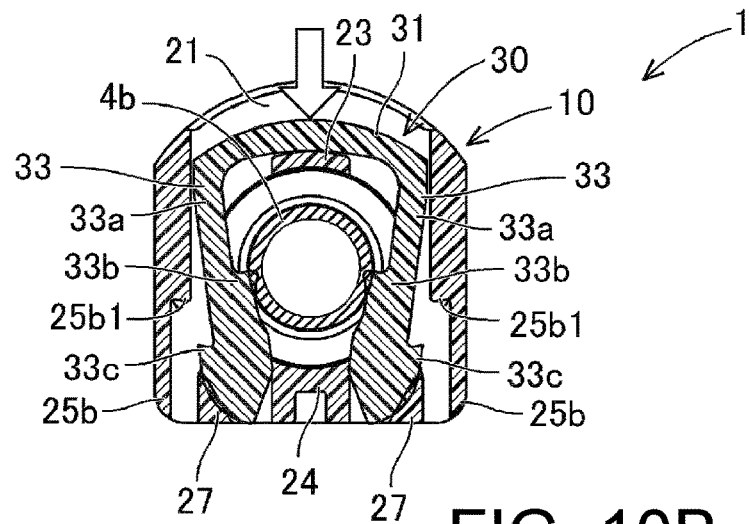
FIG. 10B is a cross-sectional view of the quick connector 1 in the initial release state, and is a view corresponding to FIG. 6E.

At this time, as shown in FIG. 10B, the lower surface of the second leg part outer protrusion 33*c* is guided by the second guide 27. Since the second guide 27 is inclined, the second leg parts 33 are elastically deformed in the direction in which the tip ends thereof approach each other. The second leg part 33 accumulates the elastic return energy for the retainer 30 to return to the standard position due to the elastic deformation of the second leg part 33.

Figure 11A:
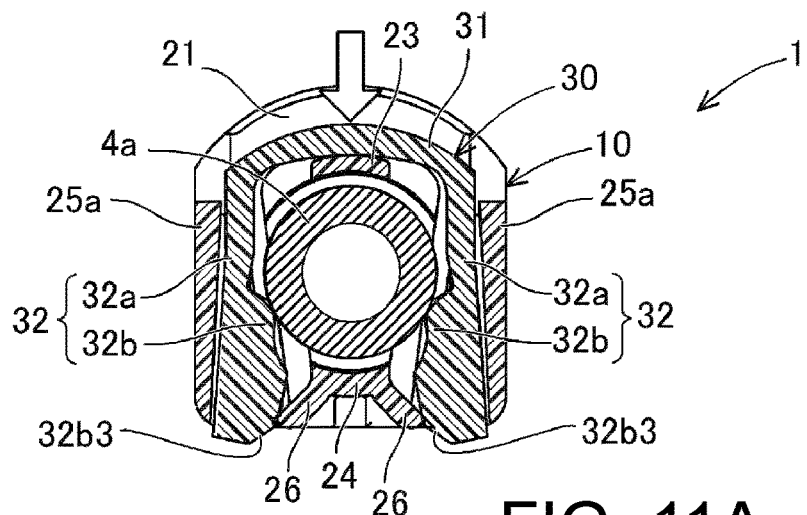
FIG. 11A is a cross-sectional view of the quick connector 1 in a late release state, and is a view corresponding to FIG. 6D.
Figure 11B:
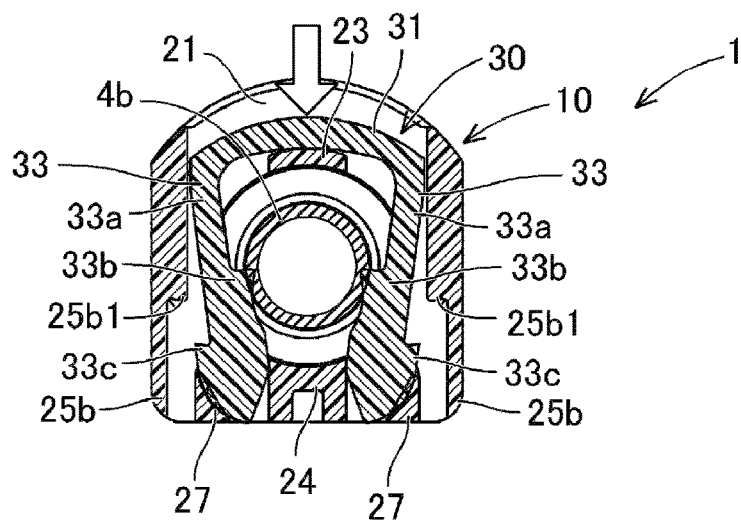
FIG. 11B is a cross-sectional view of the quick connector 1 in the late release state, and is a view corresponding to FIG. 6E.

In a state in which the retainer 30 is deformed in this way, the operator releases the pipe 4. Then, the state shown in FIGS. 11A and 11B are obtained. Then, when the operator releases the pressing force of the retainer 30 with respect to the base part 31, the retainer 30 returns to the standard position due to the elastic return energy accumulated in the second leg part 33.

(6. Outline of Quick Connector 2 in Second Example, Overall Configuration)

Figure 12:
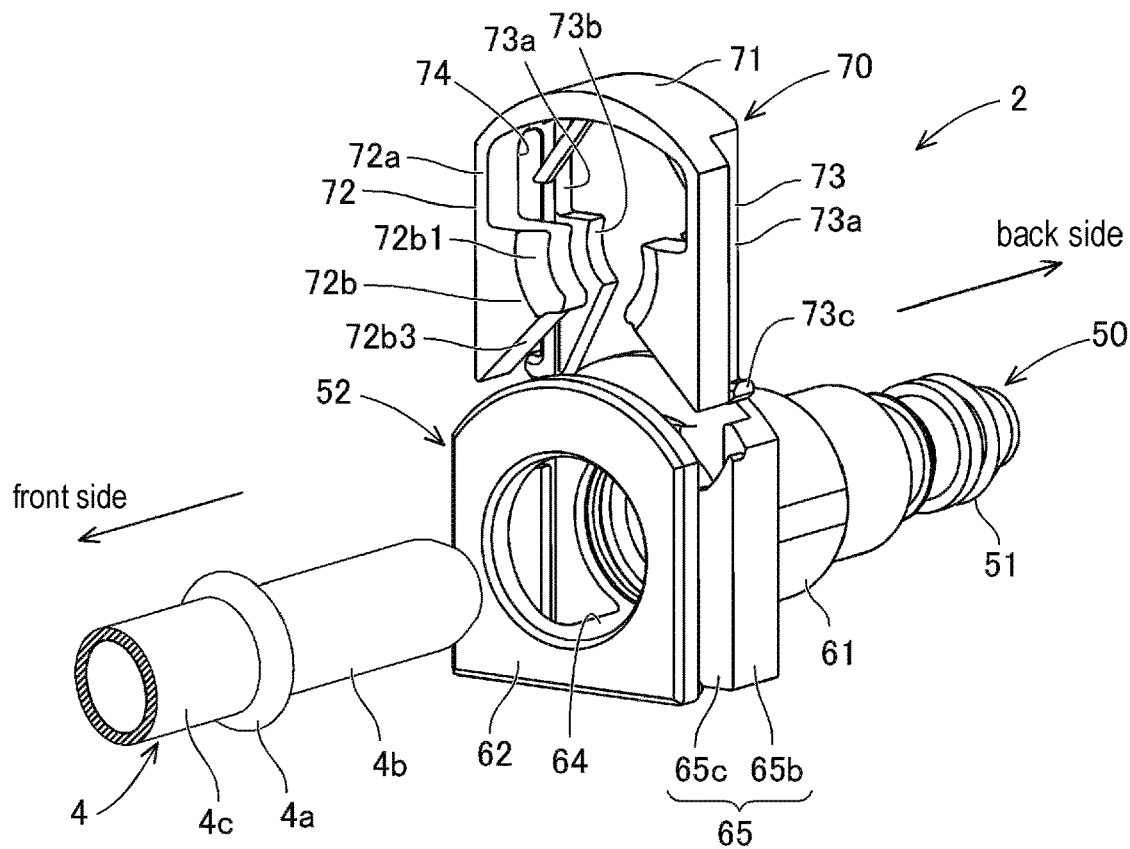
FIG. 12 is a perspective view of a state before a connector main body 50 and a retainer 70 which constitute the quick connector 2 of a second example, the resin pipe 3, and the metal pipe 4 are assembled.

Since an outline and an overall configuration of a quick connector 2 of a second example are substantially the same as the outline and the overall configuration of the quick connector 1 of the first example described above, the description thereof will be omitted. Here, the quick connector 2 of the second example includes a connector main body 50 and a retainer 70 as shown in FIG. 12. Additionally, the connector main body 50 of the second example corresponds to the connector main body 10 of the first example, and the retainer 70 of the second example corresponds to the retainer 30 of the first example.

(7. Details of Constituent Components of Quick Connector 2 of Second Example)

As described above, the quick connector 2 of the second example includes the connector main body 50 and the retainer 70. However, the quick connector 2 includes a seal unit (not shown) inside the connector main body 50.

(7-1. Configuration of Connector Main Body 50)

The configuration of the connector main body 50 will be described with reference to FIGS. 12 to 14. The connector main body 50 includes a first connection part 51 on which the resin pipe 3 is externally mounted and a second connection part 52 into which the metal pipe 4 is inserted. The first connection part 51 is provided on one end side (the back side in FIG. 12) of the connector main body 50, and the resin pipe 3 is externally mounted on the first connection part 51. An outer peripheral surface of the first connection part 51 is formed in a stepped manner in a direction along a flow path so that the resin pipe can have a removal preventing force in a state in which it is fitted thereto.

The second connection part 52 is provided on the other end side (the front side in FIG. 12) of the connector main body 50, and the tip end part 4b and the annular protrusion 4a of the metal pipe 4 can be inserted. The second connection part 52 is formed in a tubular shape into which the metal pipe 4 can be inserted, and has a hole through which a portion of the metal pipe 4 on the insertion side (the front side) passes in a direction intersecting the axial direction of the pipe 4 (the vertical direction in FIG. 12). The seal unit (not shown) is disposed on the inner peripheral side of the second connection part 52.

Figure 13:
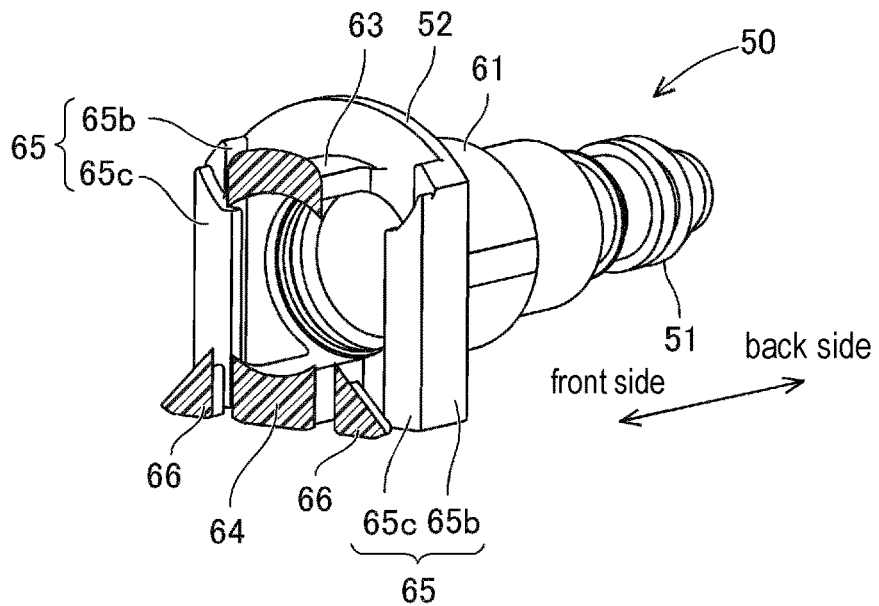
FIG. 13 is a perspective view of the connector main body 50 in which a front portion thereof is partially cut.
Figure 14:
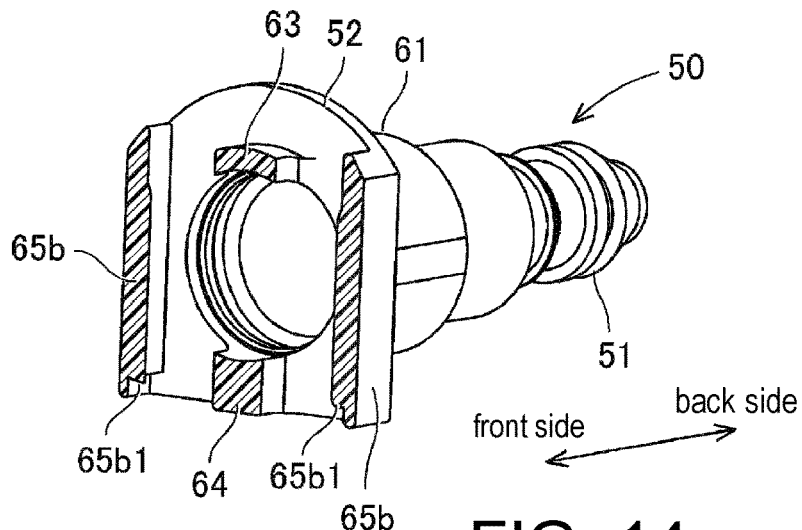
FIG. 14 is a perspective view of the connector main body 50 in which the front portion thereof is partially cut at a position on the back side of FIG. 13.

As shown in FIGS. 12 to 14, the second connection part 52 includes a tubular part 61 disposed on the back side. The first connection part 51 is connected to an end part of the tubular part 61. The seal unit is disposed in the tubular part 61, and the tip end part 4b of the metal pipe 4 is inserted therein. As shown in FIG. 14, a front end surface of the tubular part 61 is formed in a flange shape which extends outward from a circular opening in the radial direction.

As shown in FIG. 12, the second connection part 52 further includes an insertion opening surface 62 which is coaxially disposed at a distance from the front end surface of the tubular part 61 to the front side in the axial direction. The insertion opening surface 62 is formed to have the same exterior as that of the front end surface of the tubular part 61, and faces in the axial direction. A circular hole is formed in a center of the insertion opening surface 62.

As shown in FIGS. 13 and 14, the second connection part 52 further includes an upper connection part 63 and a lower connection part 64 which connect the front end surface of the tubular part 61 to the insertion opening surface 62. The upper connection part 63 connects an upper position of a hole in the front end surface of the tubular part 61 to an upper position of a hole in the insertion opening surface 62. The upper connection part 63 is formed at a position having a distance downward from an upper edge of the front end surface of the tubular part 61. Similarly, lower connection part 64 is formed at a position having a distance downward from an upper edge of the insertion opening surface 62. The lower connection part 64 connects a lower position of the hole in the front end surface of the tubular part 61 to a lower position of the hole in the insertion opening surface 62. In particular, the lower connection part 64 is formed on a lower edge of the front end surface of the tubular part 61 and a lower edge of the insertion opening surface 62.

As shown in FIGS. 12 to 14, the second connection part 52 further includes a pair of wall parts 65 and 65 provided between the front end surface of the tubular part 61 and the insertion opening surface 62 and provided on a side edge of the front end surface of the tubular part 61. Each of the pair of wall parts 65 and 65 has a distance from the upper connection part 63 in the left and right direction and has a distance from the lower connection part 64 in the left and right direction. The pair of wall parts 65 and 65 includes main wall parts 65b and 65b which are connected to the front end surface of the tubular part 61, and overhanging walls 65c and 65c which protrude from the front ends of the main wall parts 65b and 65b to the inner surface side.

As shown in FIG. 14, the main wall parts 65b and 65b are formed in a plate shape which extends in the vertical direction. Restriction parts 65b1 and 65b1 formed in a concave shape are provided at lower end parts of the main wall parts 65b and 65b. As shown in FIG. 13, the overhanging walls 65c and 65c are formed to protrude from front ends of the main wall parts 65b and 65b toward the inner surface side. The overhanging walls 65c and 65c are disposed with a gap with respect to the insertion opening surface 62 in the axial direction.

As shown in FIG. 13, the second connection part 52 further includes first guides 66 and 66. The first guides 66 and 66 are formed to have a distance in the left and right direction from both side surfaces of the lower connection part 64 and to protrude from a back surface of the insertion opening surface 62 toward the overhanging walls 65c and 65c. Upper surfaces of the first guides 66 and 66 are inclined so that normal lines thereof face upward and outward. That is, the upper surfaces of the first guides 66 and 66 are inclined downward from the lower connection part 64 side toward the outside in the left and right direction.

(7-2. Configuration of Retainer 70)

Figure 15:
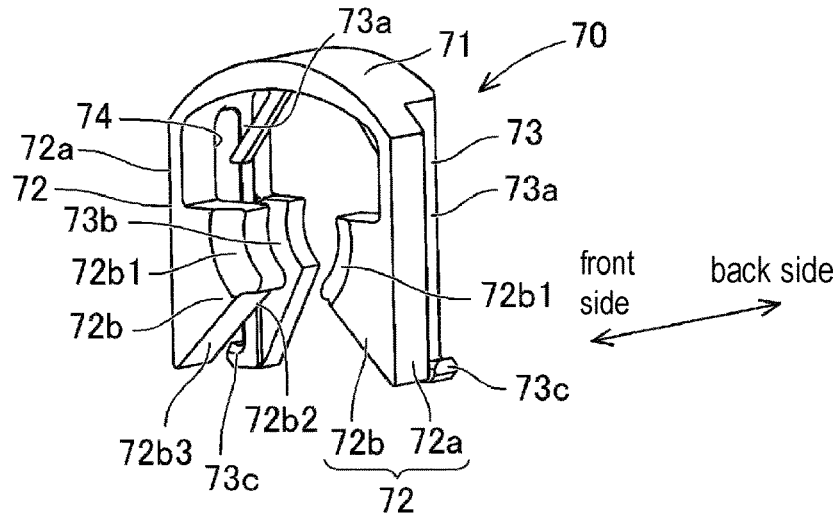
FIG. 15 is a perspective view of the retainer 70 from the front side.
Figure 16:
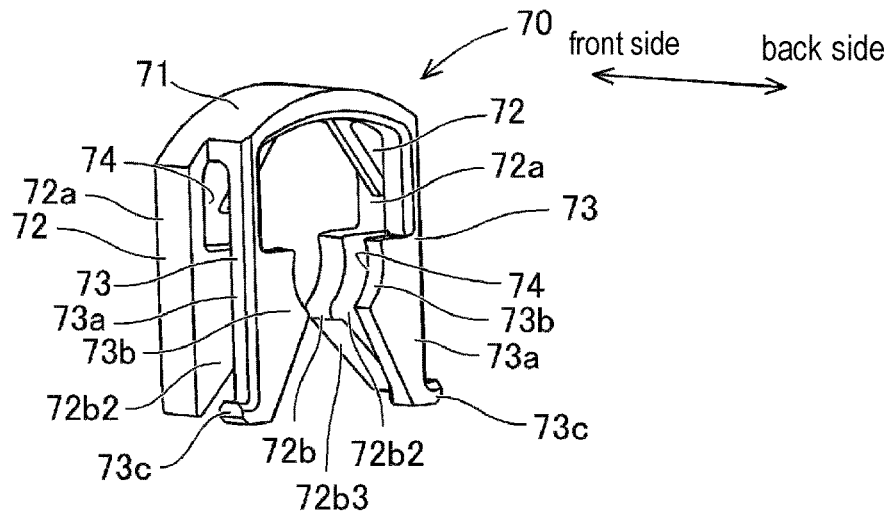
FIG. 16 is a perspective view of the retainer 70 from the back side.

A configuration of the retainer 70 will be described with reference to FIGS. 12, 15, and 16. As shown in FIG. 12, the retainer 70 is disposed in a hole which passes through the second connection part 52 of the connector main body 50 in a direction intersecting the axial direction of the second connection part 52. Therefore, the retainer 70 is configured to be movable in the direction intersecting the axial direction which is not coaxial with the axial direction of the second connection part 52 of the connector main body 50. Thus, the size of the retainer 70 itself and a portion of the connector main body 50 for disposing the retainer 70 can be reduced. As a result, a size of the quick connector 2 can be reduced.

The retainer 70 is formed in an inverted U shape. The retainer 70 includes a base part 71, a pair of first leg parts 72 and 72, and a pair of second leg parts 73 and 73. The base part 71 is located at the top of the inverted U shape and is formed in a slightly curved plate shape.

The pair of first leg parts 72 and 72 is provided on the front side of the base part 71 to be expandable and deformable at both left and right ends of the base part 71. The first leg parts 72 and 72 allow the annular protrusion 4a of the metal pipe 4 to pass therethrough in a state in which they are expanded and deformed. On the other hand, the first leg parts 72 and 72 are locked to the annular protrusion 4*a* in the axial direction in a state in which they are not expanded. The first leg parts 72 and 72 include a first leg part main body 72*a* and a first leg part protrusion 72*b*.

The first leg part main body 72*a* is formed in a rod shape which extends linearly downward from both left and right ends of the base part 71. The first leg part protrusion 72*b* is provided to protrude from the tip end side of the first leg part main body 72*a* to the facing surface side (the inner side). The first leg part protrusion 72*b* has a tapered surface 72*b*1 which is a surface on the side (the front side) on which the pipe 4 is inserted and a locking surface 72*b*2 which is a surface on the side (the back side) opposite to the side on which the pipe 4 is inserted.

The tapered surface 72*b*1 can come into contact with the annular protrusion 4*a* when the pipe 4 is inserted into the connector main body 50. The tapered surface 72*b*1 is inclined in a direction in which the first leg part 72 expands. That is, a normal line of the tapered surface 72*b*1 faces the facing surface side (the inner side) while facing the front side. The locking surface 72*b*2 is formed in a plane shape substantially orthogonal to the axial direction.

A lower surface 72*b*3 of the first leg part protrusion 72*b* is formed so that a normal line thereof faces downward and the facing surface side (the inner side). The lower surface 72*b*3 of the first leg part protrusion 72*b* can come into contact with the first guide 66 and is guided by the first guide 66.

The pair of second leg parts 73 and 73 is provided on the back side of the base part 71 to be expandable and deformable at both left and right ends of the base part 71. The second leg parts 73 and 73 are provided independent of the first leg parts 72 and 72. The second leg parts 73 and 73 are provided on the side (the back side) opposite to the side on which the pipe 4 is inserted with respect to the first leg parts 72 and 72. That is, slits 74 and 74 are formed between the first leg parts 72 and 72 and the second leg parts 73 and 73 in the axial direction.

The second leg parts 73 and 73 have a function of restricting upward movement (in a direction opposite to the prescribed direction) from the connector main body 50. The second leg parts 73 and 73 include a second leg part main body 73*a*, a second leg part inner protrusion 73*b*, and a second leg part outer protrusion 73*c*.

The second leg part main body 73*a* is formed in a rod shape which extends linearly downward from both left and right ends of the base part 71. The second leg part main bodies 73*a* are formed to be elastically deformable, and are elastically deformable in a direction in which tip ends thereof approach each other. That is, the second leg part main body 73*a* is elastically deformed in a direction opposite to a direction in which the first leg part main body 72*a* is elastically deformed.

The second leg part inner protrusion 73*b* is provided to protrude from the tip end side of the second leg part main body 73*a* to the facing surface side (the inner side). The second leg part inner protrusion 73*b* can come into contact with the annular protrusion 4*a* of the pipe 4 and is locked to the annular protrusion 4*a* in the axial direction. Both end surfaces of the second leg part inner protrusion 73*b* in the axial direction are formed in a plane shape substantially orthogonal to the axial direction. A lower surface of the second leg part inner protrusion 73*b* is formed so that a normal line thereof faces downward and the facing surface side (the inner side).

The second leg part outer protrusion 73*c* (a restriction part) is provided to protrude from the tip end side of the second leg part main body 73*a* to the side (the outer side) opposite to the facing surface. The second leg part outer protrusion 73*c* is locked to the restriction parts 65*b*1 and 65*b*1 of the main wall parts 65*b* and 65*b*. That is, the second leg part outer protrusion 73*c* has a function of restricting movement of the retainer 70 from the connector main body 50 in the direction opposite to the prescribed direction.

(8. Explanation of Operation when Inserting a Pipe)

An operation until the metal pipe 4 is inserted into the quick connector 2 and the pipe 4 is completely locked by the retainer 70 will be described.

(8-1. State Before Pipe Insertion)

First, a state before the pipe is inserted will be described with reference to FIGS. 17A to 17E. The state before the pipe is inserted is a state in which the retainer 70 is located at the standard position with respect to the connector main body 50 and the pipe 4 is before being inserted into the connector main body 50.

The retainer 70 is mounted from above between the front end surface of the tubular part 61 of the connector main body 50 and the insertion opening surface 62 in the axial direction. That is, the pair of first leg parts 72 and 72 and the pair of second leg parts 73 and 73 are pressed to straddle the upper connection part 63. As shown in FIGS. 17B to 17E, the base part 71 is located above the upper connection part 63 with a gap therebetween. A separation distance between the base part 71 and the upper connection part 63 in the vertical direction is a distance at which the retainer 70 can move downward (in the prescribed direction).

Figure 17A:
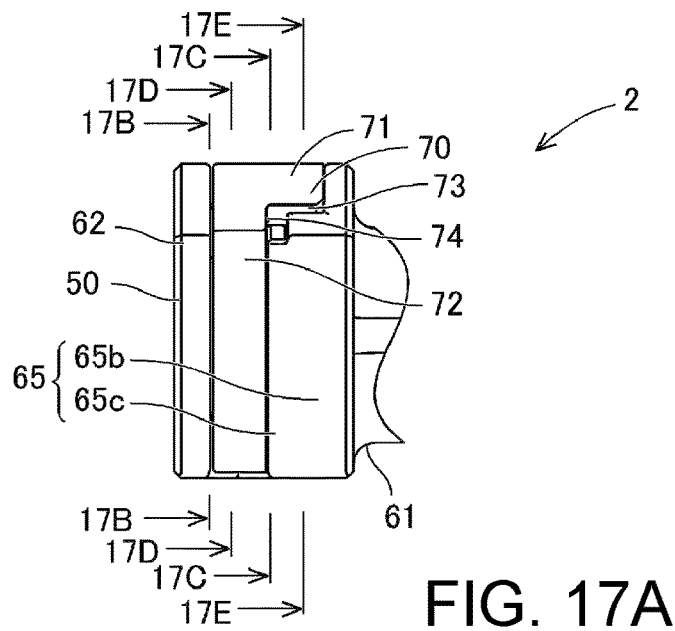
FIG. 17A is a side view of the quick connector 2 in a state before the pipe is inserted.
Figure 17B:
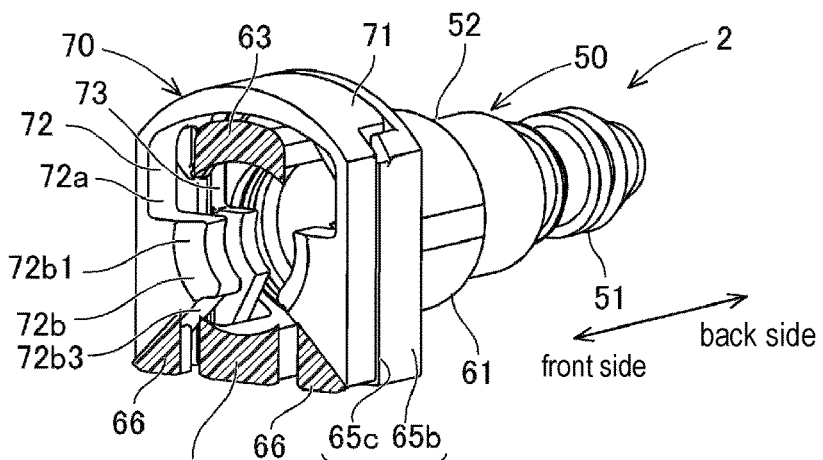
FIG. 17B is a perspective view along line 17B-17B of FIG. 17A.
Figure 17C:
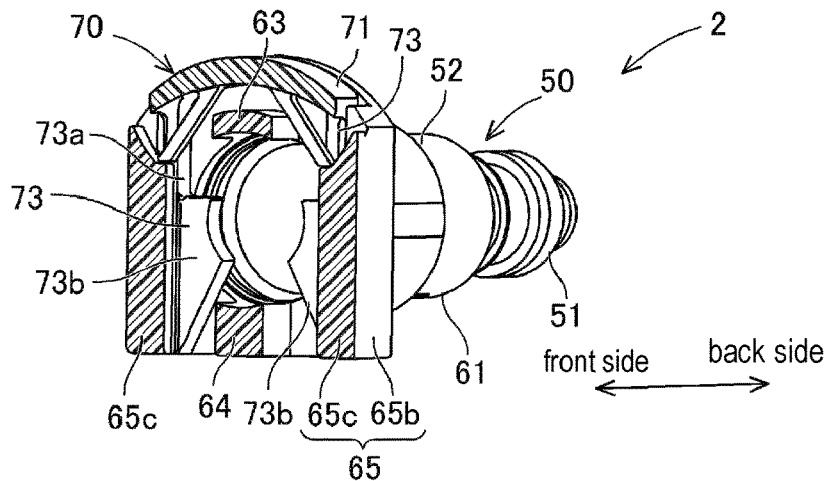
FIG. 17C is a perspective view along line 17C-17C of FIG. 17A.
Figure 17D:
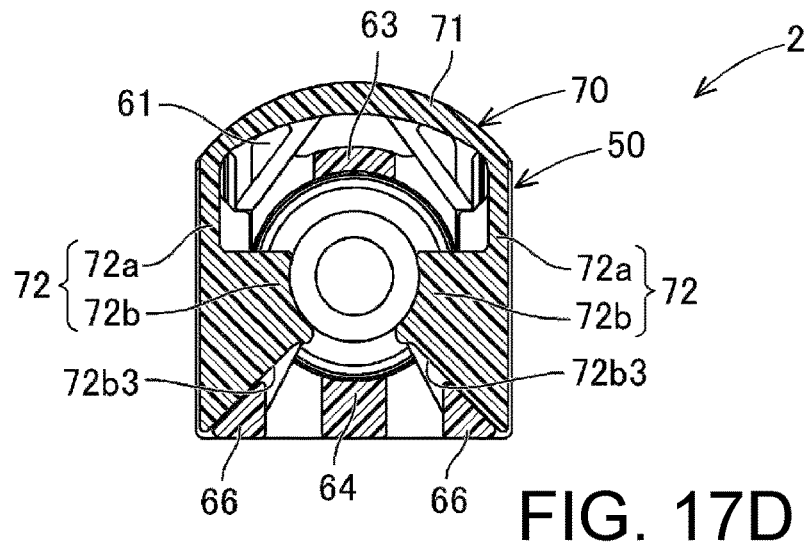
FIG. 17D is a cross-sectional view along line 17D-17D of FIG. 17A.

As shown in FIGS. 17B and 17D, the first leg parts 72 and 72 are disposed between the insertion opening surface 62 and the overhanging walls 65*c* and 65*c*. That is, outer surfaces of the first leg part main bodies 72*a* and 72*a* are exposed sideways. As shown in FIG. 17B, the tapered surface 72*b*1 of the first leg part protrusion 72*b* faces the insertion opening surface 62 side. Then, most of the tapered surface 72*b*1 is located at a position visible from the hole in the insertion opening surface 62. The lower surface 72*b*3 (the tip end of the first leg part 72) of the first leg part protrusion 72*b* faces the first guide 66.

Figure 17E:
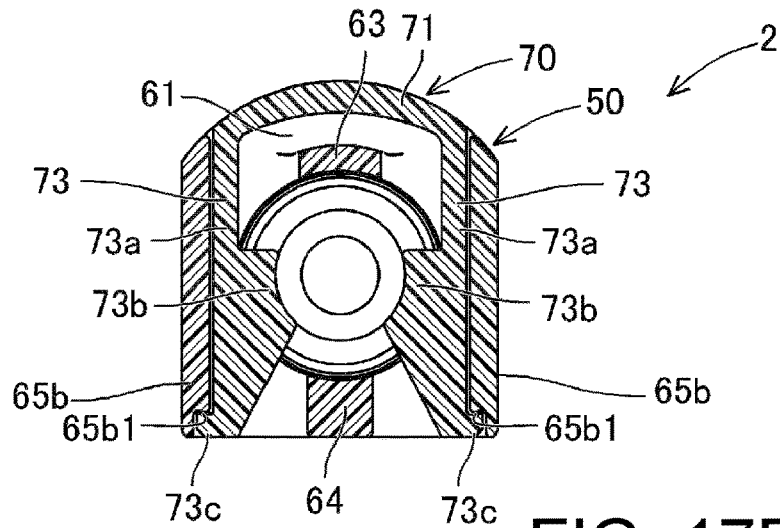
FIG. 17E is a cross-sectional view along line 17E-17E of FIG. 17A.

Further, as shown in FIGS. 17C and 17E, the main wall parts 65*b* and 65*b* protect the second leg parts 73 and 73 from the outside by being disposed to face the outer surfaces of the second leg parts 73 and 73 and reducing the exposed surfaces of the second leg parts 73 and 73. The second leg part main body 73*a* is disposed to have a slight gap with respect to the main wall parts 65*b* and 65*b*. Therefore, the expansion and deformation of the second leg part main body 73*a* are restricted by the main wall parts 65*b* and 65*b*.

Further, the second leg part outer protrusion 73*c* is locked to the restriction parts 65*b*1 and 65*b*1 of the main wall parts 65*b* and 65*b*. Thus, movement of the retainer 70 in the pulling-out direction (opposite to the prescribed direction) with respect to the connector main body 50 is restricted. Further, the overhanging walls 65*c* and 65*c* are inserted into the slits 74 and 74. As a result, the posture of the retainer 70 is maintained.

(8-2. Partially Inserted Pipe State)

A partially inserted pipe state will be described with reference to FIGS. 18A and 18B and 19A and 19B. The partially inserted pipe state is a state in which a part of the pipe 4 is inserted, and a middle state in which the pipe 4 is located on the front side from the normal position in the axial direction.

Figure 18A:
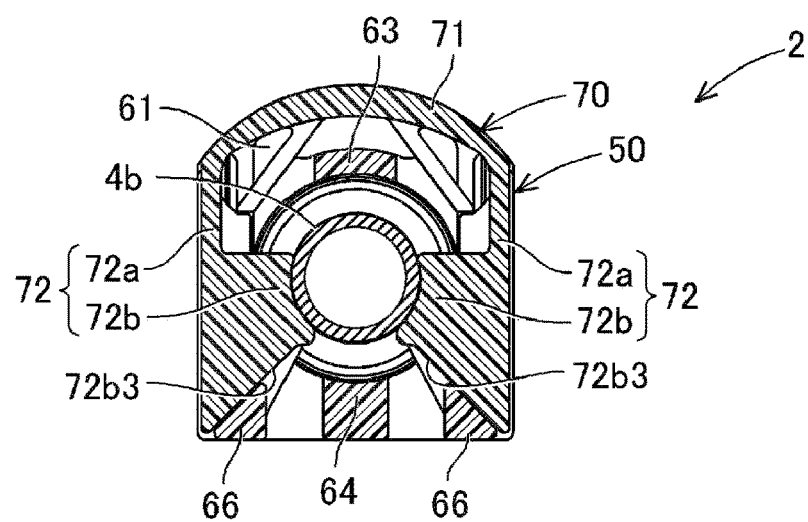
FIG. 18A is a cross-sectional view of the quick connector 2 in a first state in which a pipe is partially inserted, and is a view corresponding to FIG. 17D.
Figure 18B:
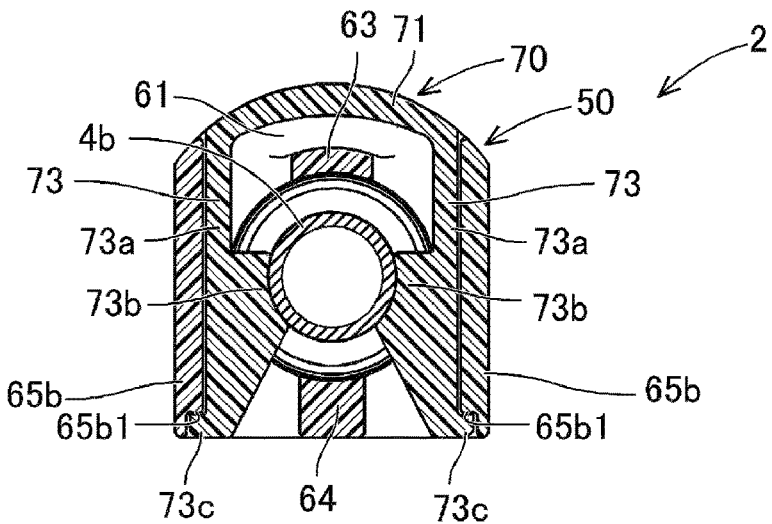
FIG. 18B is a cross-sectional view of the quick connector 2 in the first state in which the pipe is partially inserted, and is a view corresponding to FIG. 17E.

A state in which only the tip end part 4b of the pipe 4 is inserted into the connector main body 50 is shown in FIGS. 18A and 18B. At this time, the tip end part 4b of the pipe 4 is about the same as an inscribed circle of the first leg part protrusion 72b of the first leg part 72. Therefore, the first leg part 72 is in a state in which a diameter thereof is not expanded and deformed at all, or even when the diameter is expanded and deformed, the diameter is expanded and deformed very slightly. Similarly, the tip end part 4b of the pipe 4 is about the same as an inscribed circle of the second leg part inner protrusion 73b of the second leg part 73. Therefore, the second leg part 73 is in a state in which the diameter thereof is not expanded and deformed at all, or even when the diameter is expanded and deformed, the diameter is expanded and deformed very slightly. That is, in the state in which only the tip end part 4b of the pipe 4 is inserted into the connector main body 50, the retainer 70 is in the same position and posture as the state before the pipe is inserted.

Figure 19A:
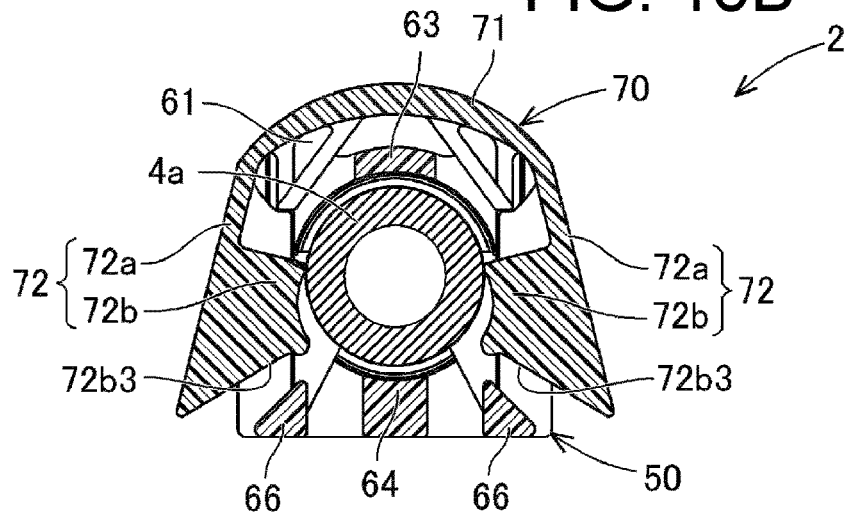
FIG. 19A is a cross-sectional view of the quick connector 2 in a second state in which the pipe is partially inserted, and is a view corresponding to FIG. 17D.
Figure 19B:
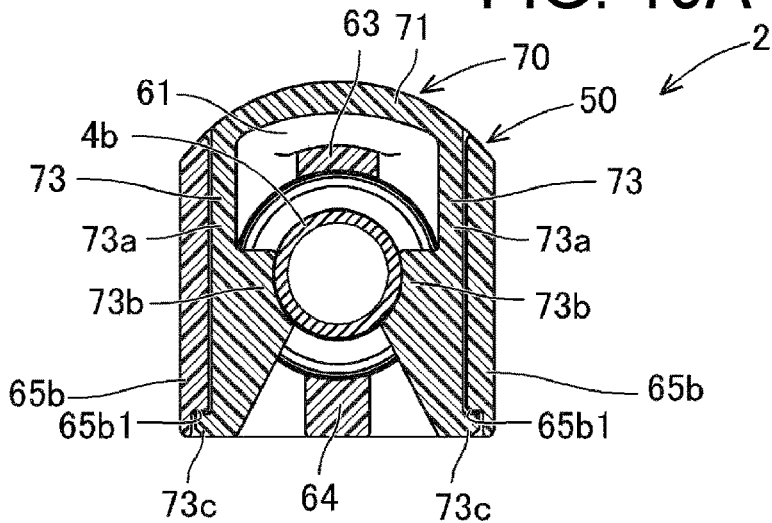
FIG. 19B is a cross-sectional view of the quick connector 2 in the second state in which the pipe is partially inserted, and is a view corresponding to FIG. 17E.

A state in which the pipe 4 is further deeply inserted into the connector main body 50 is shown in FIGS. 19A and 19B. FIGS. 19A and 19B show a state in which the annular protrusion 4a of the pipe 4 is located at the position of the first leg part 72.

When the pipe 4 is further inserted to the back side, the annular protrusion 4a of the pipe 4 comes into contact with the tapered surface 72b1 of the first leg part protrusion 72b of the first leg part 72. Then, a pressing force in the axial direction acts on the tapered surface 72b1 due to the annular protrusion 4a. Here, the overhanging walls 65c and 65c are located on the back side of the first leg part main body 72a. Therefore, the deformation of the first leg part 72 in the axial direction is restricted by the overhanging walls 65c and 65c.

Then, a normal line of the tapered surface 72b1 of the first leg part protrusion 72b faces the facing surface side (the inner side) while facing the front side. Therefore, due to the pressing force on the tapered surface 72b1 in the axial direction by the annular protrusion 4a, a force in the expansion direction acts on the tapered surface 72b1. As shown in FIG. 19A, the tip end side of the first leg part 72 is expanded and deformed by the force acting on the tapered surface 72b1 in the expansion direction. At this time, the first leg part 72 is expanded and deformed in a non-contact state with the first guide 66. Then, the annular protrusion 4a of the pipe 4 can pass through the first leg part 72 in the insertion direction due to the expansion and deformation of the first leg part 72. The second leg part outer protrusion 73c of the second leg part 73 maintains a state in which it is locked to the restriction parts 65b1 and 65b1 of the main wall parts 65b and 65b.

(8-3. Pipe Insertion Complete State)

Figure 20A:
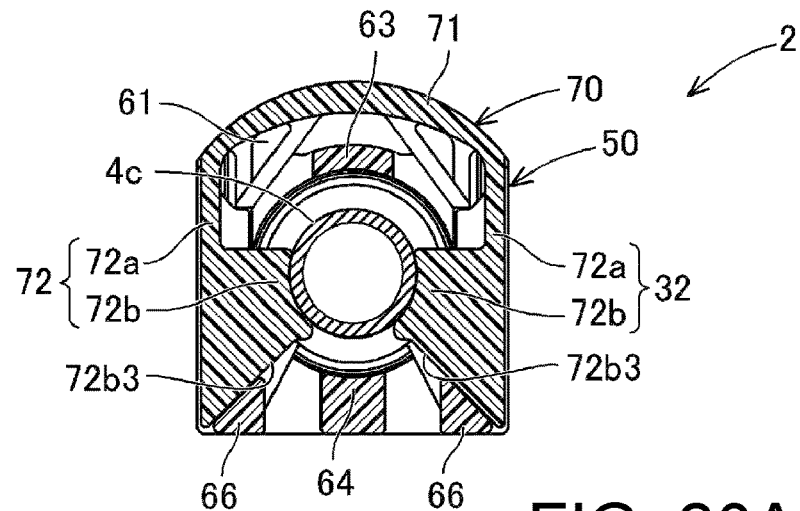
FIG. 20A is a cross-sectional view of the quick connector 2 in a state in which the pipe is completely inserted, and is a view corresponding to FIG. 17D.
Figure 20B:
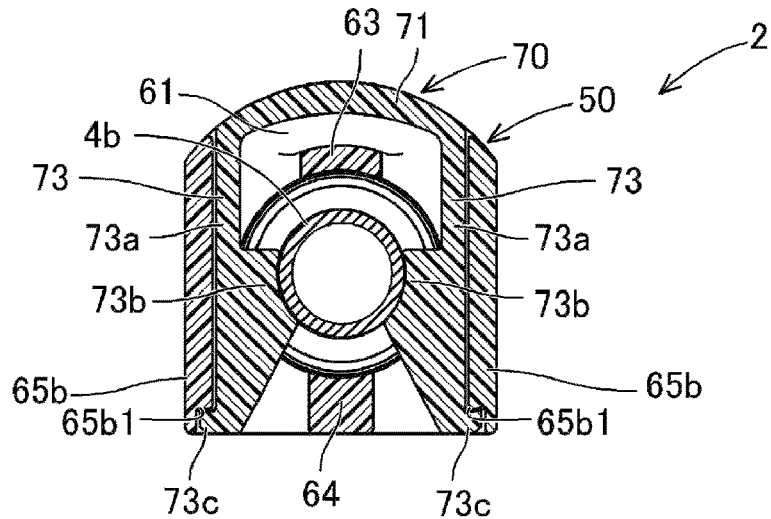
FIG. 20B is a cross-sectional view of the quick connector 2 in the state in which the pipe is completely inserted, and is a view corresponding to FIG. 17E.

A pipe insertion complete state will be described with reference to FIGS. 20A and 20B. The pipe insertion complete state is a state in which the retainer 70 is located at the standard position and the pipe 4 is located at the normal position.

The pipe 4 is further inserted to the back side from the partially inserted pipe state shown in FIGS. 19A and 19B. Then, the annular protrusion 4a passes through the first leg part 72 and reaches the gap between the first leg part 72 and the second leg part 73 in the axial direction. A state in which the annular protrusion 4a is located at the relevant position is a state in which the pipe 4 is located at the normal position.

Due to the annular protrusion 4a passing through the first leg part 72, the pressing force from the annular protrusion 4a does not act on the first leg part 72. Therefore, the force in the direction in which the diameter expands does not act on the first leg part 72. Therefore, the first leg part 72 returns from the expanded and deformed state to the original state. That is, an amount of expansion of the diameter of the first leg part 72 becomes zero.

In the state in which the retainer 70 returns to the standard position, the annular protrusion 4a is sandwiched between the first leg part protrusion 72b of the first leg part 72 and the second leg part inner protrusion 73b of the second leg part 73 in the axial direction, and thus the pipe 4 is positioned in the axial direction. Then, the annular protrusion 4a is in a state in which it faces the locking surface 72b2 of the first leg part protrusion 72b of the first leg part 72. The pipe 4 is locked to the retainer 70 by locking the locking surface 72b2 with respect to the annular protrusion 4a in this way.

As described above, when the pipe 4 is inserted into the normal position, the operator simply inserts the pipe 4 without performing any movement operation of the retainer 70. This is because the retainer 70 can prevent the pipe 4 from being removed in a standard state in which no operation is performed. Therefore, mountability of the pipe 4 becomes very good.

(9. Explanation of Operation at the Time of Release)

Figure 21A:
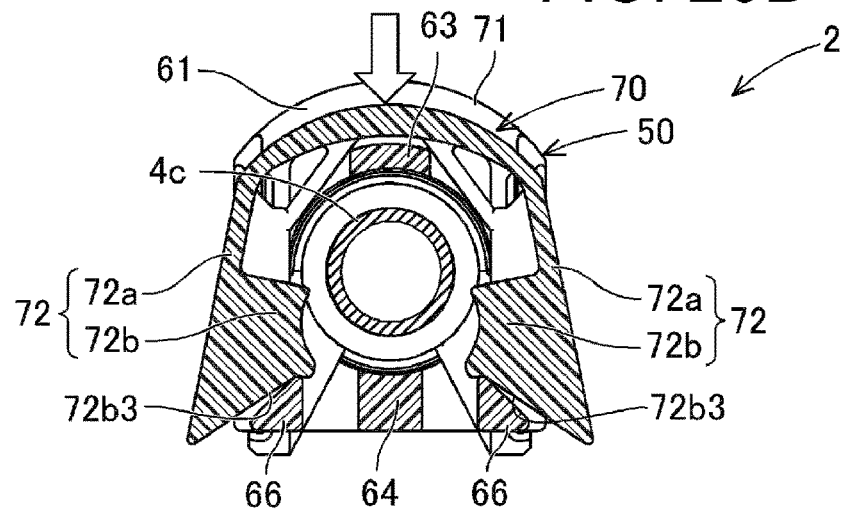
FIG. 21A is a cross-sectional view of the quick connector 2 in an initial release state, and is a view corresponding to FIG. 17D.
Figure 21B:
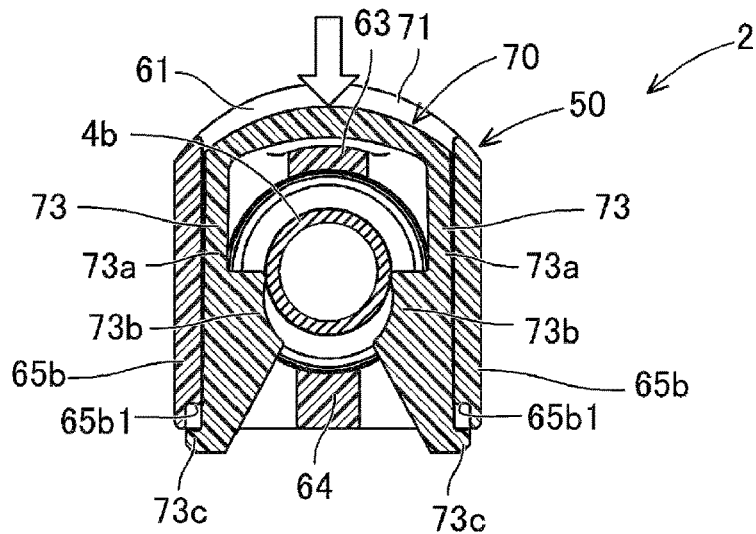
FIG. 21B is a cross-sectional view of the quick connector 2 in the initial release state, and is a view corresponding to FIG. 17E.

An operation in which the pipe 4 is released from the normal position in the state in which the metal pipe 4 is inserted into the quick connector 2 will be described with reference to FIGS. 21A and 21B and 22A and 22B. When the pipe 4 is released from the normal position, the operator first operates the retainer 70 to move it downward (in the press-in direction, the prescribed direction) from the standard position. Then, as shown in FIGS. 21A and 21B, the retainer 70 moves.

The base part 71 can be moved to a position at which it comes into contact with the upper connection part 63. When the retainer 70 is pressed downward, the lower surface 72b3 of the first leg part protrusion 72b of the first leg part 72 comes into contact with the first guide 66. Here, the first guide 66 is inclined in the direction in which the first leg part 72 expands. Therefore, the first leg part 72 is expanded and deformed by the lower surface 72b3 of the first leg part protrusion 72b coming into contact with the first guide 66. The annular protrusion 4a of the pipe 4 can pass through the first leg part 72 in the release direction from the normal position due to the expansion and deformation of the first leg part 72 in this way.

Figure 22A:
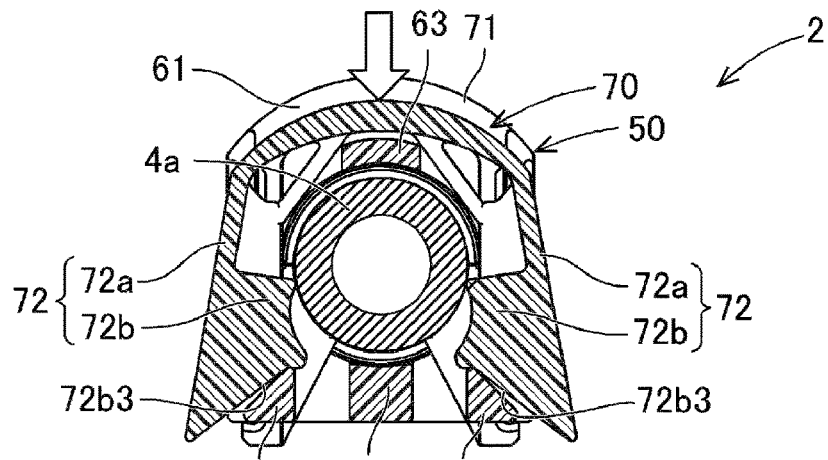
FIG. 22A is a cross-sectional view of the quick connector 2 in a late release state, and is a view corresponding to FIG. 17D.
Figure 22B:
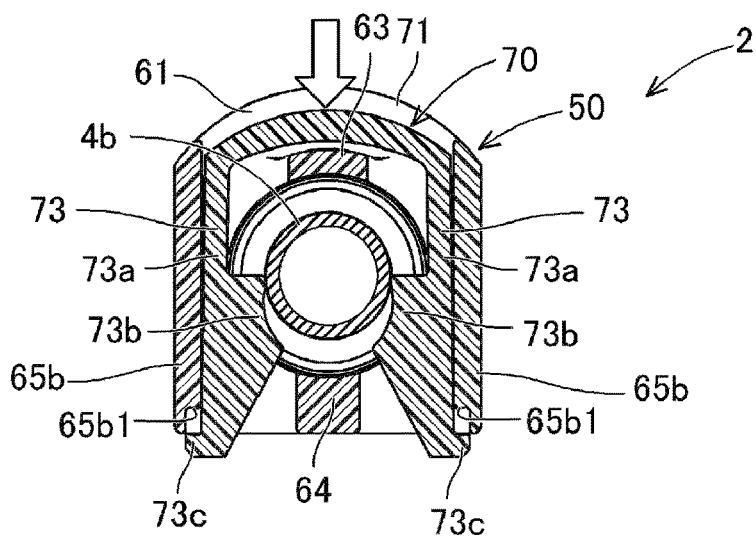
FIG. 22B is a cross-sectional view of the quick connector 2 in the late release state, and is a view corresponding to FIG. 17E.

In the state in which the retainer 70 is deformed in this way, the operator releases the pipe 4. Then, the state shown in FIGS. 22A and 22B is obtained. Then, when the operator releases the pressing force of the retainer 70 with respect to the base part 71, the retainer 70 returns to the standard position due to the elastic return energy accumulated in the second leg part 73.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A quick connector comprising:
a connector main body into which a pipe with an annular protrusion is able to be inserted, wherein the pipe is inserted into the quick connector along an axial direction of the pipe; and
a retainer which is formed separately from the connector main body, is disposed in the connector main body by being inserted into the connector main body in a prescribed direction intersecting the axial direction of the pipe and to be movable from a standard position in the prescribed direction intersecting the axial direction of the pipe, and prevents the pipe from being removed by locking the pipe in the axial direction of the pipe with respect to the annular protrusion in a state in which the pipe is inserted at a normal position of the connector main body, wherein the standard position is a position at which the retainer is mounted in the connector main body and the pipe is not inserted, and the normal position is a position at which the pipe is inserted and locked to the annular protrusion in the axial direction of the pipe while the retainer is located at the standard position, wherein the retainer includes a base part, and a pair of first leg parts which is provided on the base part to be expandable and deformable so that the annular protrusion is allowed to pass therethrough in an expanded and deformed state, and is locked to the annular protrusion in the axial direction of the pipe in a state in which the retainer is located at the standard position and does not expand, the first leg part further includes a tapered surface which is formed on a surface on which the pipe is inserted and is allowed to come into contact with the annular protrusion when the pipe is inserted into the connector main body, and a locking surface which is formed on a surface opposite to a side on which the pipe is inserted and is locked to the annular protrusion, the connector main body further includes a first guide which is allowed to come into contact with the first leg part and expands and deforms the first leg part by moving the retainer further inward into the connector main body, when the pipe is inserted into the connector main body, the first leg part is expanded and deformed by a pressing force on the tapered surface in the axial direction of the pipe by the annular protrusion, and the annular protrusion of the pipe is allowed to pass through the first leg part in an insertion direction by expansion and deformation of the first leg part, and when the pipe is released from the normal position of the connector main body, the first leg part comes into contact with the first guide to be expanded and deformed by operating the retainer to move from the standard position further inward into the connector main body, and the annular protrusion of the pipe is allowed to pass through the first leg part in a release direction by expansion and deformation of the first leg part.

2. The quick connector according to claim 1, wherein the tapered surface is inclined with respect to the prescribed direction in which the retainer moves, and when the pipe is inserted into the connector main body, the retainer moves from the standard position in the prescribed direction by applying a force in the prescribed direction on the tapered surface due to the pressing force on the tapered surface in the axial direction of the pipe by the annular protrusion, the first leg part comes into contact with the first guide to be expanded and deformed by the retainer moving from the standard position in the prescribed direction, and the annular protrusion of the pipe is allowed to pass through the first leg part in the insertion direction by expansion and deformation of the first leg part.

3. The quick connector according to claim 2, wherein the tapered surface is inclined with respect to the prescribed direction in which the retainer moves and is also inclined in a direction in which the first leg part expands, when the pipe is inserted into the connector main body, the retainer moves in the prescribed direction from the standard position by applying a force in the prescribed direction on the tapered surface due to the pressing force on the tapered surface in the axial direction of the pipe by the annular protrusion, and the first leg part comes into contact with the first guide and is expanded and deformed by the retainer moving from the standard position in the prescribed direction, the first leg part is expanded and deformed by applying a force on the tapered surface in an expansion direction of the first leg part due to the pressing force on the tapered surface in the axial direction of the pipe by the annular protrusion, and the annular protrusion of the pipe is allowed to pass through the first leg part in the insertion direction by expansion and deformation of the first leg part.

4. The quick connector according to claim 1, wherein the tapered surface is inclined in a direction in which the first leg part expands, when the pipe is inserted into the connector main body, in a state in which the first leg part is not in contact with the first guide, the first leg part is expanded and deformed by applying a force on the tapered surface in an expansion direction of the first leg part due to the pressing force on the tapered surface in the axial direction of the pipe by the annular protrusion, and the annular protrusion of the pipe is allowed to pass through the first leg part in the insertion direction by expansion and deformation of the first leg part.

5. The quick connector according to claim 1, wherein the prescribed direction is a direction in which the base part of the retainer is pressed into the connector main body.

6. The quick connector according to claim 1, wherein the first guide is disposed at a position which faces a tip end of the first leg part, and is inclined in a direction in which the first leg part expands.

7. The quick connector according to claim 1, wherein the connector main body further includes a first wall part which is disposed to face an outer surface of the first leg part, restricts an amount of expansion and deformation of the first leg part, and protects the first leg part.

8. The quick connector according to claim 1, wherein the retainer further includes a pair of second leg parts which is provided on the base part independent of the pair of first leg parts and is provided on a side opposite to a side on which the pipe is inserted with respect to the first leg part, and the second leg part includes a restriction part which restricts movement of the retainer from the standard position in a direction opposite to the prescribed direction.

9. The quick connector according to claim 8, wherein the second leg parts are formed to be elastically deformable, and elastic return energy for the retainer to return to the standard position is accumulated by the retainer being elastically deformed when it moves from the standard position in the prescribed direction.

10. The quick connector according to claim 9, wherein the second leg parts are elastically deformable in a direction in which tip ends of the second leg parts approach each other.

11. The quick connector according to claim 10, wherein the connector main body further includes a second guide which is allowed to come into contact with the second leg parts and elastically deforms the second leg parts by the retainer moving in the prescribed direction.

12. The quick connector according to claim 11, wherein the second guide is disposed at a position which faces the tip ends of the second leg parts, and is inclined in a direction in which the tip ends of the second leg parts approach each other when the retainer moves in the prescribed direction.

13. The quick connector according to claim 10, wherein the connector main body further includes a second wall part which is disposed to face an outer surface of the second leg part, restricts the expansion and deformation of the second leg part, and protects the second leg part.

14. The quick connector according to claim 1, wherein the connector main body does not have an element which restricts the annular protrusion in a direction in which the pipe is removed.

15. The quick connector according to claim 1, wherein the connector main body and the retainer are formed of different materials.

* * * * *